(12) United States Patent
Koganezawa

(10) Patent No.: US 6,392,848 B1
(45) Date of Patent: *May 21, 2002

(54) HEAD CARRIAGE ASSEMBLY AND DISK DEVICE INCORPORATING THEREOF

(75) Inventor: Shinji Koganezawa, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/271,529

(22) Filed: Mar. 18, 1999

(30) Foreign Application Priority Data

Mar. 20, 1998 (JP) .......................................... 10-072882

(51) Int. Cl.[7] .......................... G11B 21/02; G11B 21/10
(52) U.S. Cl. ................................. 360/294.5; 360/294.6
(58) Field of Search ............................. 360/290, 294.3, 360/294.4, 294.5, 294.6

(56) References Cited

U.S. PATENT DOCUMENTS

| 4,969,058 A | * | 11/1990 | Williams et al. ......... 360/77.03 |
| 5,214,552 A | * | 5/1993 | Haga ........................... 360/106 |
| 5,216,559 A | * | 6/1993 | Springer ..................... 360/106 |
| 5,267,110 A | * | 11/1993 | Ottesen et al. ............. 360/106 |
| 5,343,345 A | * | 8/1994 | Gilovich ..................... 360/104 |
| 5,452,153 A | * | 9/1995 | Baheri et al. ............. 360/78.05 |
| 5,521,778 A | * | 5/1996 | Boutaghou et al. ......... 360/106 |
| 5,745,319 A | * | 4/1998 | Takekado et al. ......... 360/78.05 |
| 5,781,381 A | * | 7/1998 | Koganezawa et al. ...... 360/106 |
| 5,793,571 A | * | 8/1998 | Jurgenson et al. .......... 360/104 |
| 5,805,375 A | * | 9/1998 | Fan et al. ................. 360/78.12 |
| 5,867,347 A | * | 2/1999 | Knight et al. ................ 360/104 |
| 5,898,544 A | * | 4/1999 | Krinke et al. ................ 360/104 |
| 5,936,805 A | * | 8/1999 | Imaino ........................ 360/104 |
| 6,002,549 A | * | 12/1999 | Berman et al. ............. 360/104 |
| 6,025,975 A | * | 2/2000 | Fard et al. ................... 360/109 |
| 6,043,957 A | * | 3/2000 | Hattori et al. .............. 360/106 |
| 6,046,888 A | * | 4/2000 | Krinke et al. ................ 360/104 |

FOREIGN PATENT DOCUMENTS

| JP | 59-96571 | | 6/1984 |
| JP | 59-116965 | | 7/1984 |
| JP | 59-191175 | | 10/1984 |
| JP | 62-208439 | | 9/1987 |
| JP | 3-80474 | | 4/1991 |
| JP | 4-134681 | | 5/1992 |
| JP | 7-201148 | | 8/1995 |
| JP | 7-244528 | | 9/1995 |
| JP | 7-244940 | | 9/1995 |
| JP | 8-306142 | | 11/1996 |
| JP | 9-35429 | | 2/1997 |
| JP | 9-82048 | | 3/1997 |
| JP | 9-161425 | | 6/1997 |
| JP | 10-255413 | * | 9/1998 |

* cited by examiner

Primary Examiner—William Klimowicz
(74) Attorney, Agent, or Firm—Greer, Burns & Crain, Ltd.

(57) ABSTRACT

A head carriage assembly includes a head carriage having a magnetic head at a first end part and a bearing between the first end part and a second end part, the head carriage being pivotable about a shaft cooperating with the bearing in such a manner that the head moves in a radial direction of a rotating disk to be read. The head carriage assembly further includes a first driving device provided at the second end of the head carriage and generating a force for pivoting the head carriage and, second driving device generating a further force for pivoting the head carriage.

21 Claims, 22 Drawing Sheets

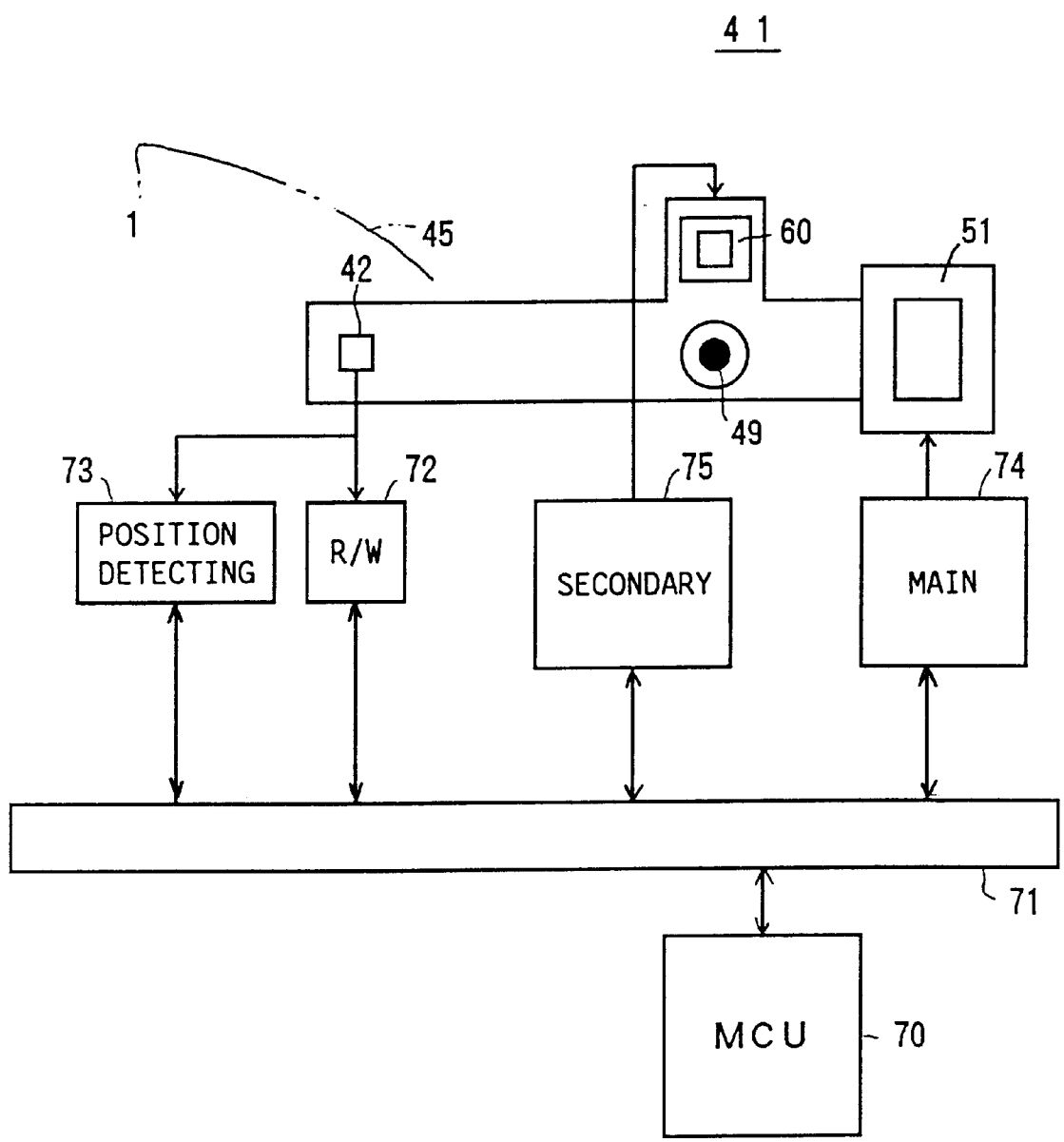

FIG. 11A
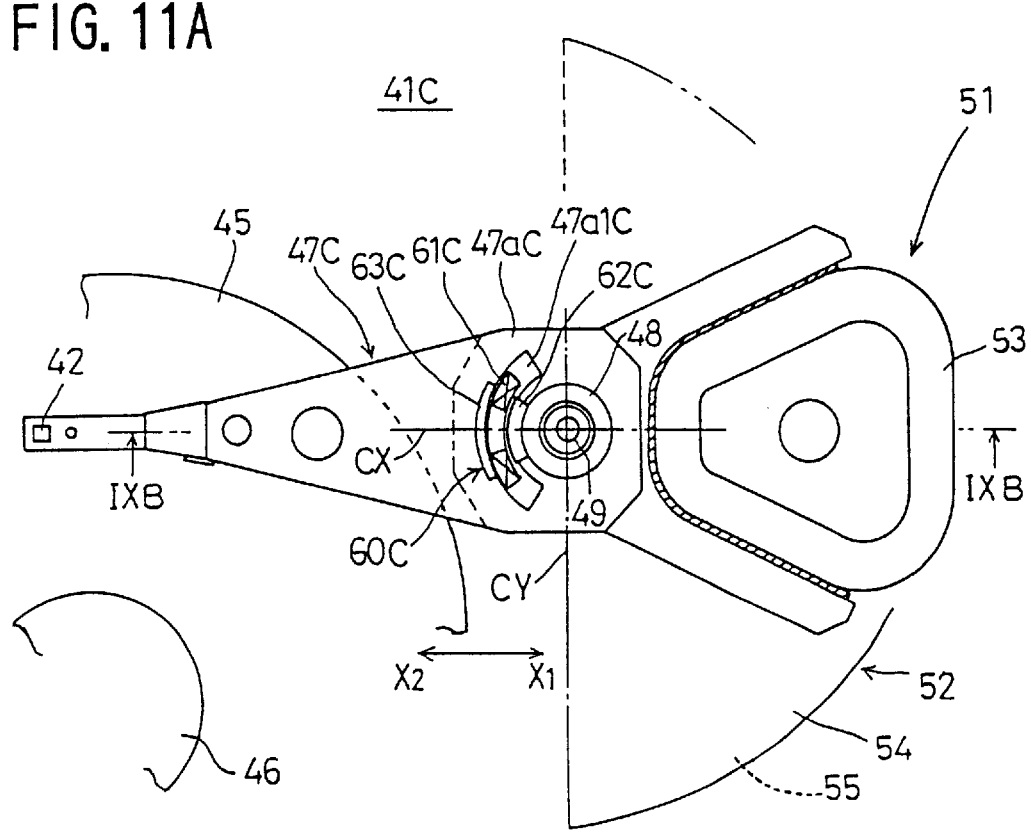
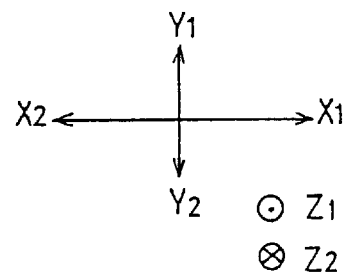
FIG. 11B
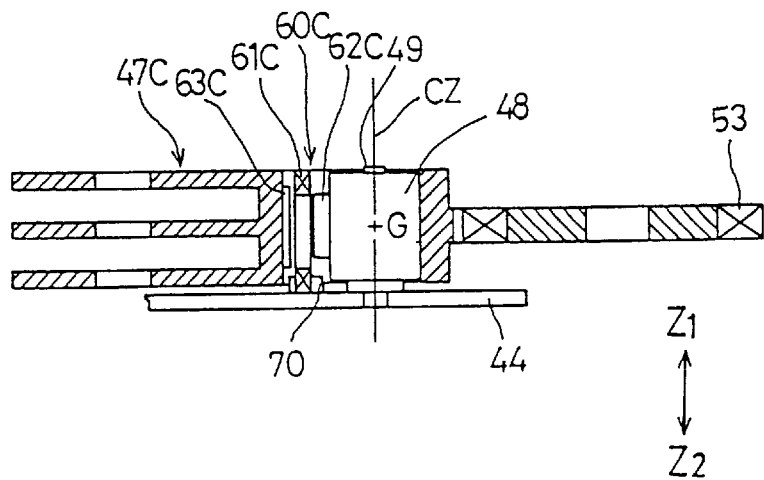

HEAD CARRIAGE ASSEMBLY AND DISK DEVICE INCORPORATING THEREOF

BACKGROUND OF THE INVENTION

1. Field of the Invention

The present invention generally relates to a head carriage assembly and a disk device incorporating thereof, and particularly relates to a magnetic head carriage assembly suitable for high-density recording and a magnetic disk device incorporating thereof.

2. Description of the Related Art

There is a continuous effort toward developing magnetic disk devices, for example, a 3.5-inch type, which devices are capable of implementing a high-density recording. In order to achieve a high-density recording, it is necessary to increase the value of tracks per unit length (TPI) of magnetic disks. With such an increased value of TPI, a width of each track will be narrowed, so that it is necessary to improve a positioning accuracy of the magnetic head. When the value of TPI is increased to 25000, a track pitch will be 1 $\mu$m, so that the positioning accuracy of the magnetic head needs to be less than 0.1 $\mu$m.

A basic way of improving the positioning accuracy of the magnetic head is to increase a loop gain in a positioning-servo system so as to obtain a higher crossover frequency in an open loop. An upper limit of the loop gain in the positioning-servo system depends on a natural frequency of the head carriage supported at a bearing so as to be pivotable about a shaft. Therefore, the magnetic disk device of the related art is designed such that the head carriage has a high rigidity, so that the natural frequency of the head carriage is increased and the loop gain in the positioning-servo system is as great as possible.

However, even if the rigidity of the head carriage is maximized, it is not possible to prevent a translational force from acting on a bearing in a direction influencing the positioning of the magnetic head. In other words, a translational mode occurs at the bearing. Therefore, it is difficult to achieve a positioning accuracy of less than 0.1 $\mu$m of the magnetic head.

Japanese Laid-Open Patent Nos. 59-116965 and 8-306142 disclose magnetic head carriage assemblies which can prevent such a translational mode from occurring at the bearing.

FIGS. 1A and 1B are diagrams showing a magnetic head carriage assembly 10 described in Japanese Laid-Open Patent No. 59-116965. The magnetic head carriage assembly 10 includes a head carriage 11 having a magnetic head 15 at one end and a bearing 12 at the other end. The magnetic head carriage assembly 10 also includes magnetic driving mechanisms 13, 14 provided on both sides of the bearing 12. The magnetic driving mechanisms 13, 14 are driven simultaneously in mutually equal and opposite directions, thus causing the head carriage 11 to pivot about the bearing 12. The magnetic head 15 is moved in a radial direction of the rotating magnetic disk 16 so as to implement seeking and positioning operations. A translational force acting on the bearing 12 is cancelled by equal and opposite forces F1, F2 which are exerted by the magnetic driving mechanisms 13, 14 driven simultaneously.

FIG. 2 is a diagram showing a magnetic head carriage assembly 20 described in Japanese Laid-Open Patent No. 8-306142. The magnetic head carriage assembly 20 includes a head carriage 21 having a magnetic head 27 at one end and a bearing 22 at the other end. The magnetic head carriage assembly 20 also includes magnetic driving mechanisms 23, 24 provided on both sides of the bearing 22. In the figure, reference numeral 25 show an axis in a longitudinal direction of the head carriage 21. Reference numeral 26 show a line passing through the bearing 22 and perpendicular to the axis 25.

The magnetic driving mechanisms 23, 24 are provided at positions on an opposite side of the head carriage 27 with respect to the line 26 (right hand side in FIG. 2). Forces F3, F4 are produced by actuating the magnetic driving mechanisms 23, 24, so that the head carriage 21 is pivoted about the bearing 22. The magnetic head 27 is moved in a radial direction of the rotating magnetic disk 28 so as to implement seeking and positioning operations. A translational force acting on the bearing 22 is reduced by the forces F3, F4 which are exerted by the magnetic driving mechanism 23, 24.

With the magnetic head carriage assembly shown in FIGS. 1A and 1B, since the translational force acting on the bearing 12 is cancelled out, it is possible to increase the loop gain in the positioning-servo system and thus accurately positioning the magnetic head. However, as can be seen from FIG. 1A, the magnetic driving mechanism 14 constrains a freedom of a layout of the magnetic disk 16 and the magnetic head carriage assembly 10. Therefore, it is a problem that the magnetic head device cannot be assembled easily. Also, it is a problem that information recorded on the magnetic disc 16 may be degraded since the magnetic circuit of the magnetic driving mechanism 14 is too close to the magnetic disk 16.

According to the magnetic head carriage assembly 20 shown in FIG. 2, the limitation of the layout between the magnetic disk 28 and the magnetic head carriage assembly 20 is reduced by a certain amount compared to the magnetic head carriage assembly 10 shown in FIG. 1. However, since the forces F3, F4 both include components in the direction of the line 26, a translational force F5 is produced which acts on the bearing 22. Therefore, a translational mode is produced at the bearing 22. The translational force F5 acts in the direction of the line 26, which direction influences the positioning accuracy of the magnetic head, 27 with respect to the track. Therefore, it is difficult to improve the positioning accuracy of the magnetic head.

SUMMARY OF THE INVENTION

Accordingly, it is a general object of the present invention to provide a head carriage assembly and a disk device incorporating thereof which can solve the problems above.

It is another and more specific object of the invention to provide a magnetic head carriage assembly and a magnetic disk device which can achieve an increased recording density while achieving an accurate positioning of a magnetic head.

In order to achieve the above objects, a head carriage assembly includes:

a head carriage having a magnetic head at a first end part and a bearing between the first end part and a second end part, the head carriage being pivotable about a shaft cooperating with the bearing in such a manner that the head moves in a radial direction of a rotating disk to be read;

first driving means provided at the second end of the head carriage and generating a force for pivoting the head carriage; and second driving means generating a further force for pivoting the head carriage.

In one aspect of the above-described head carriage assembly, the second driving means is provided at a location on a line passing through the shaft and perpendicular to a longitudinal axis of the head carriage. Further, such a location may be on the opposite side of a center of rotation of the disk with respect to the longitudinal axis.

In another aspect of the above-described head carriage assembly, the second driving means is provided at a location on a longitudinal axis of the head carriage between the first end and the bearing.

With the head carriage assembly described above, it is possible to improve an accuracy of a track-following operation while preventing the disk and the head carriage assembly from interfering with each other.

It is still another object of the present invention to provide a disk device which can achieve an increased recording density while achieving an accurate positioning of a magnetic head.

In order to achieve the above object, a disk device includes:

1) a chassis base;
2) a disk to be rotated about a spindle fixed on the chassis base;
3) a head carriage assembly comprising:
   a head carriage having a magnetic head at a first end part and a bearing between the first end part and a second end part, the head carriage being pivotable about a shaft cooperating with the bearing in such a manner that the head moves in a radial direction of the rotating disk to be read;
   first driving means provided at the second end of the head carriage and generating a force for pivoting the head carriage; and
   second driving means also generating-a force for pivoting the head carriage; and
4) control means so as to operate the head carriage assembly either in a seek operation in which the head is moved to another track or in a track-following operation in which the head is moved to follow a track on which the head is currently placed.

In one aspect of the above-described disk device, the second driving means is provided at a location on a line passing through the shaft and perpendicular to a longitudinal axis of the head carriage. With this structure, since a translational force acting on the head carriage is in a longitudinal direction of the head carriage, no translational mode due to a rigidity of the bearing will be excited in a positioning direction. Therefore, it is possible to reduce the peak level of the translational mode so that a resonance frequency limiting the servo bandwidth may be increased.

In another aspect of the above-described disk device, the second driving means is provided at a location on a line passing through the shaft and perpendicular to a longitudinal axis of the head carriage. With this structure, by actuating first and second driving means during the track-following operation, a higher primary resonance frequency. is obtained so that the loop gain of the positioning-servo system and the servo bandwidth is increased.

In still another aspect of the above-described disk device, the second driving means is provided at a location on a longitudinal axis of the head carriage between the first end and the bearing. Width this structure, by actuating only second driving means during the track-following operation, the translational mode resulting from the rigidity of the bearing will be in phase with the rigid body mode. Since this in phase mode does not affect the stability of, the servo-system, the loop gain of the positioning-servo system and the servo band width are increased.

Other objects and further features of the present invention will be apparent from the following detailed description when read in conjunction with the accompanying drawings.

BRIEF DESCRIPTION OF THE DRAWINGS

FIG. 6 is a block diagram showing a circuit associated with the magnetic head carriage assembly.

FIGS. 11A and 11B are a plan view and a cross-sectional view, respectively, showing a magnetic head carriage assembly provided on a magnetic disk device of a second embodiment of the present invention.

DETAILED DESCRIPTION OF THE PREFERRED EMBODIMENTS

In the following, principles and embodiments of the present invention will be described with reference to the accompanying drawings.

Although the present invention is directed to a head carriage and a disk device, for the sake of convenience, the following detailed description will be made with regards to a magnetic head carriage and a magnetic desk device.

Figure 1A:
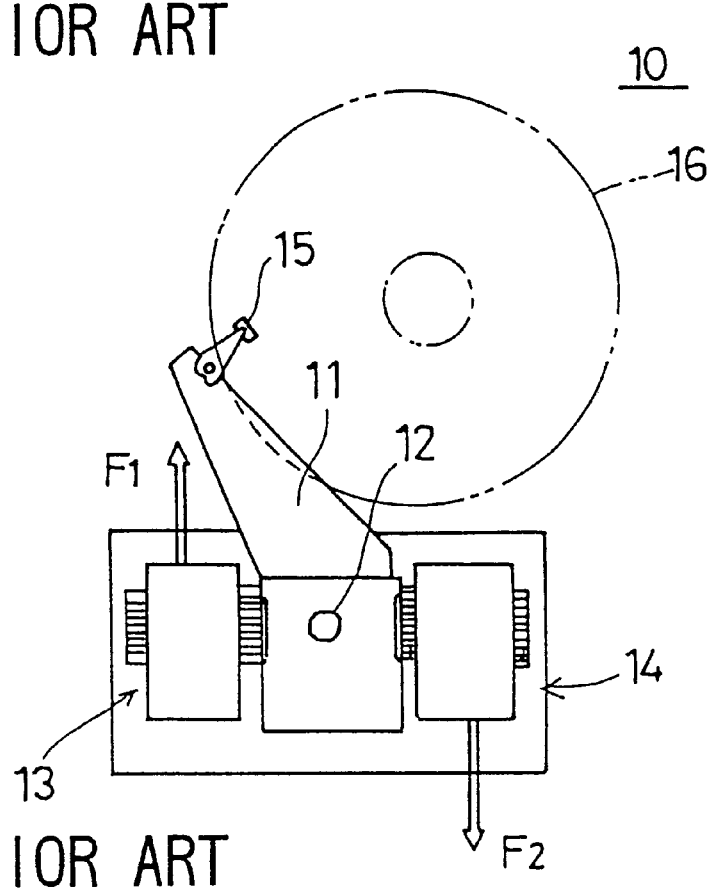
FIGS. 1A and 1B are a plan view and a cross-sectional diagram, respectively, showing an example of a magnetic head carriage assembly of the related art.
Figure 1B:
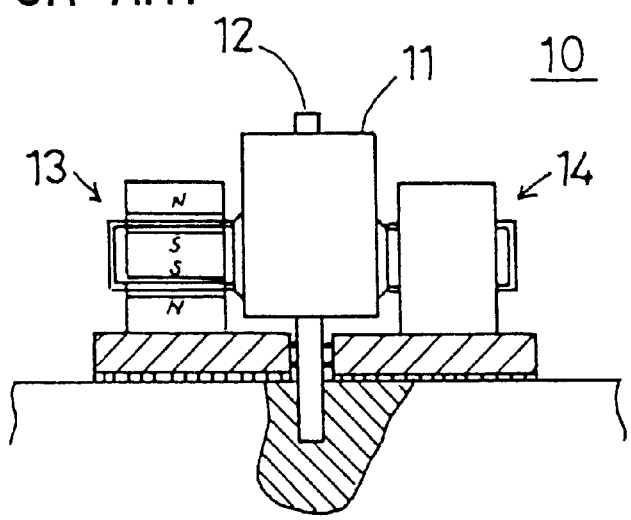
Figure 2:
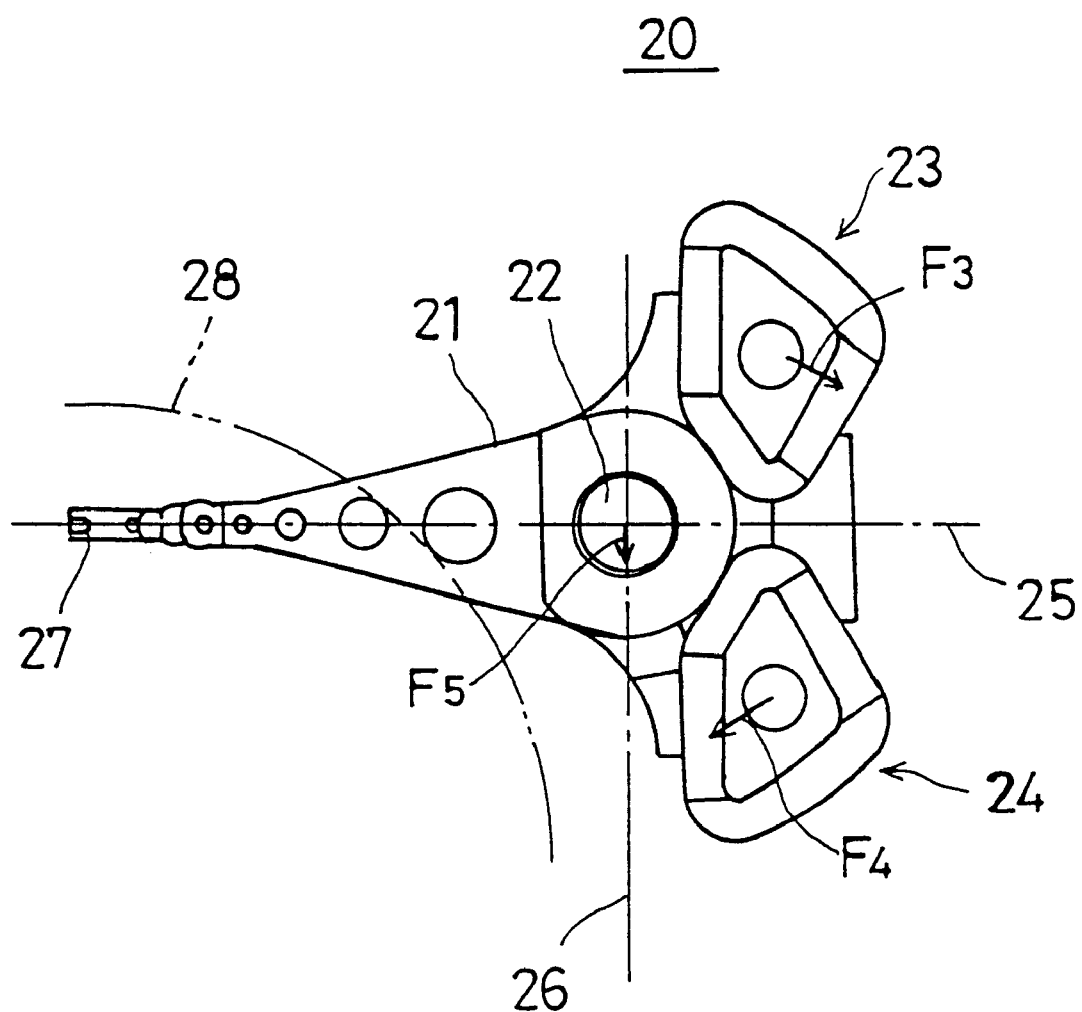
FIG. 2 is a plan view of another example of a magnetic head carriage assembly of the related art.
Figure 3A:
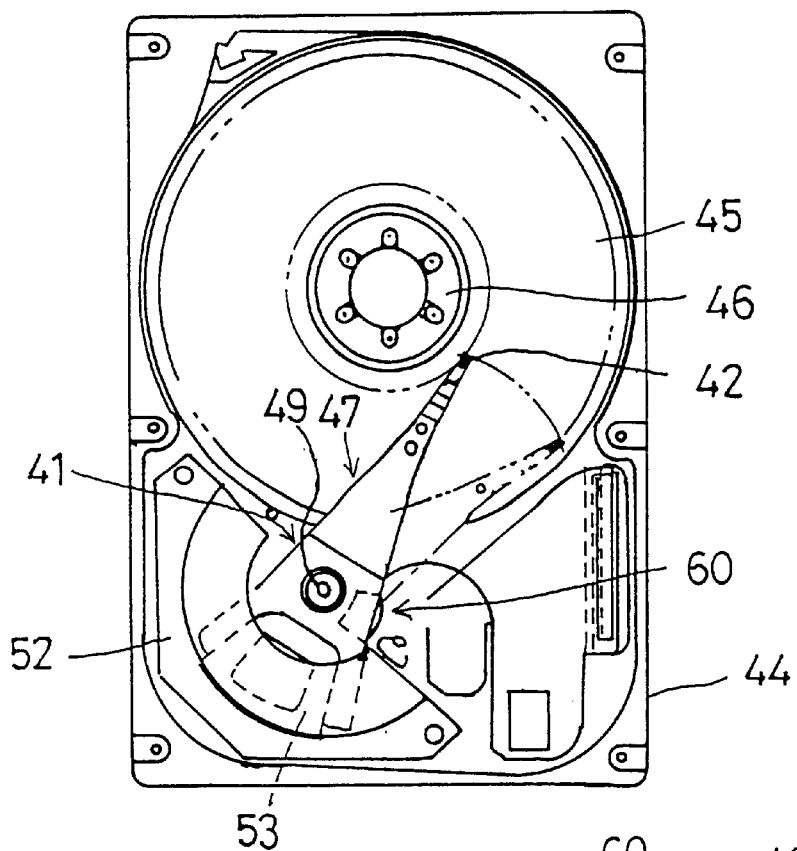
FIGS. 3A and 3B are a plan view and a perspective view, respectively, showing a magnetic disk device of a first embodiment of the present invention.
Figure 3B:
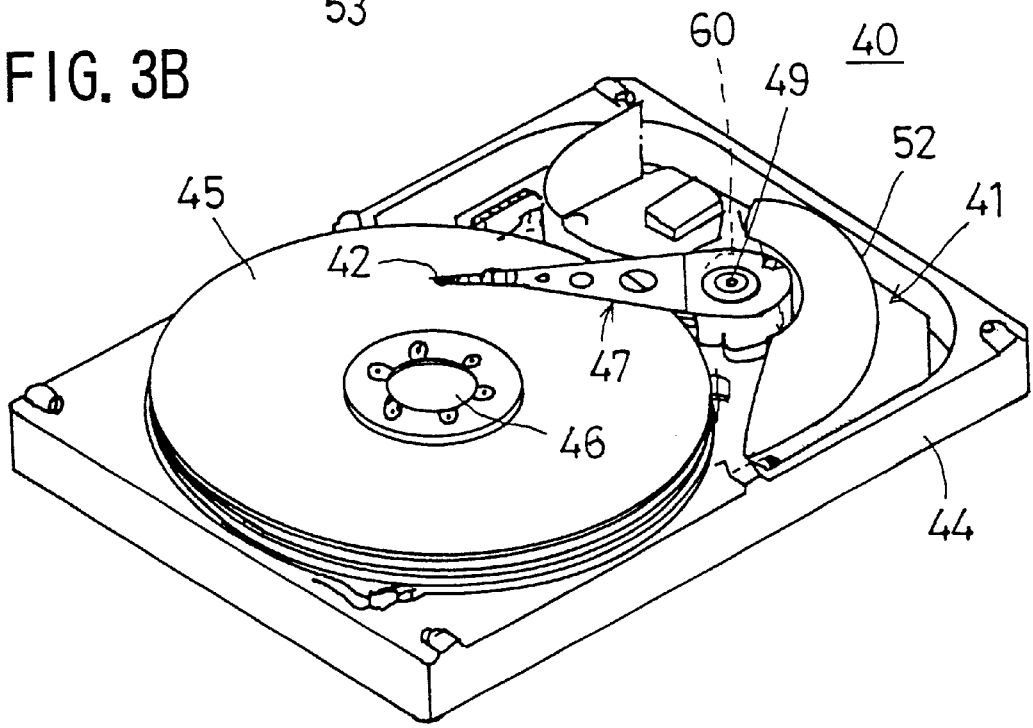
Figure 4:
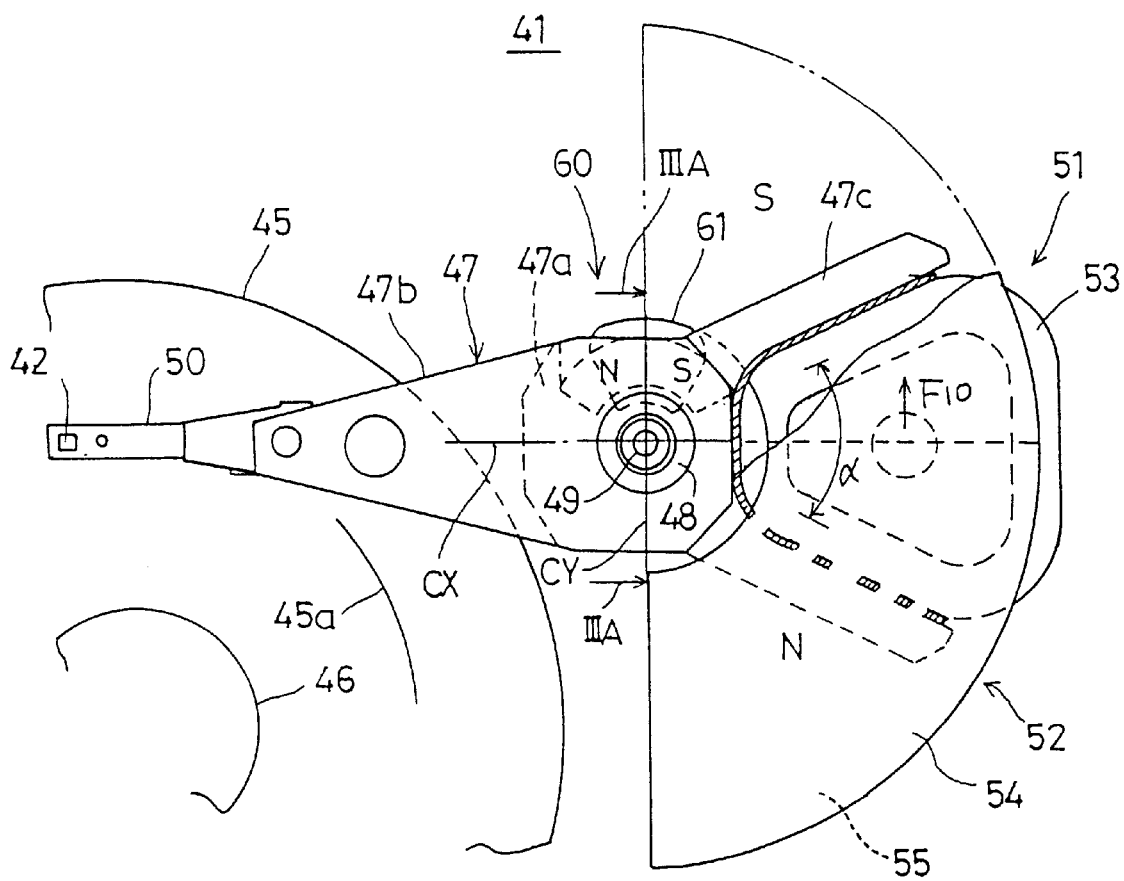
FIG. 4 is a plan view showing a magnetic head carriage assembly shown in FIG. 3A.

FIGS. 3A and 3B are a plan view and a perspective view, respectively, showing a magnetic disk device 40 of a first embodiment of the present invention. FIG. 4 is a plan view showing a magnetic head carriage assembly 41 shown in FIG. 3A. FIG. 4 shows a state where a magnetic head slider 42 is placed above a magnetic disk 45 substantially at the middle of the radius of the disk 45.

Figure 5A:
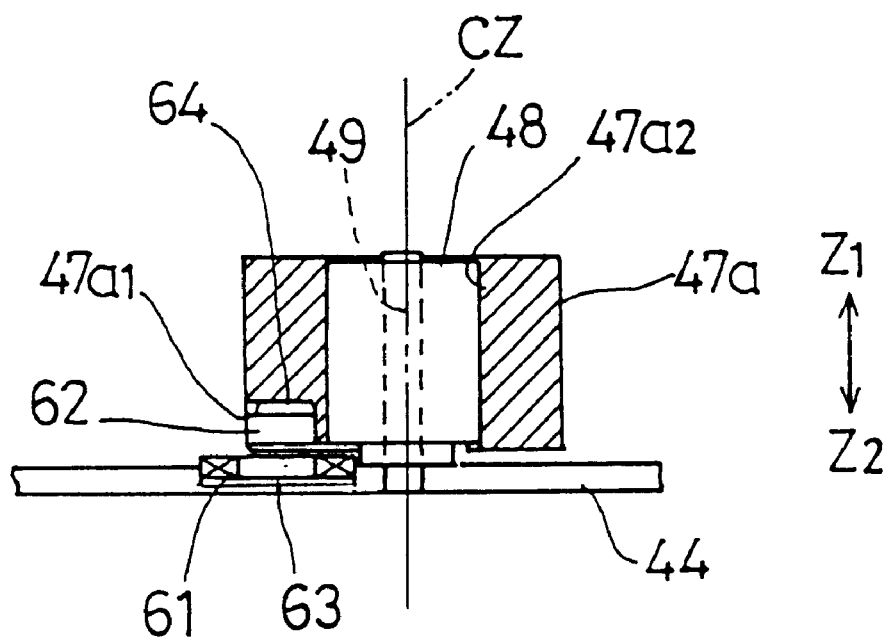
FIGS. 5A and 5B are a cross-sectional view and a plan view, respectively, showing a secondary magnetic driving unit in FIG. 4.

FIG. 5A is a cross-sectional view showing a secondary magnetic driving unit shown in FIG. 4 taken along a line IIIA—IIIA.

As shown in FIGS. 3A and 3B, the magnetic disk device 40 includes a box-shaped chassis base 44 which is provided with a magnetic disk 45 rotatably supported by a spindle 46 and with a magnetic head carriage assembly 41 incorporated in the chassis base 44.

As shown in FIG. 4, the magnetic head carriage assembly 41 has an arm-shaped head carriage 47. The head carriage 47 includes a hub part 47a, an arm part 47b extending in an X2-direction from the hub part 47a, and a fork-shaped part 47c extending in an X1-direction from the hub part 47a.

As shown in FIG. 5A, a bearing 48 cooperates with a shaft 49 secured on the chassis base 44. The hub part 47a of the head carriage 27 has a through-hole 47a2 which fits with the bearing 48. Thus, the head carriage 47 is supported so as to be pivotable about the shaft 49.

In FIG. 4, reference CX is an axis in a longitudinal direction of the head carriage 47 and passes through the shaft 49. Reference CY is a line passing through the shaft 49 and perpendicular to the axis CX. Reference CZ, shown in FIG. 5, is a longitudinal axis of the shaft 49. Here, X1 and X2 directions indicate opposite directions of the axis CX, Y1 and Y2 directions indicate opposite directions of the line CY, and Z1 and Z2 directions indicate opposite directions of the axis CZ.

At the X2-direction end of the arm part 47b, there is provided a head suspension 50 having the head slider 42 with a magnetic head at an edge of the head slider 42. The pivotal movement of the head carriage 47 causes the magnetic head slider 42 to move in the radial direction of the rotating magnetic disk 45.

At the X1-direction end of the head carriage 47, there is provided a main magnetic driving unit 51 which is actuated during a seek operation. The main magnetic driving unit 51 corresponds to a first driving means. The main magnetic driving unit 51 includes a magnetic circuit unit 52 fixed on the chassis base 44 and a flat quadrilateral driving coil 53 fixed on the fork-shaped part 47c of the head carriage 47. The magnetic circuit unit 52 includes a permanent magnet 54 provided adjacent the Z1-direction side of the driving coil 53 and a yoke 55 provided adjacent the Z2-direction side of the driving coil 53. The permanent magnet 54 has a flat arcuate shape, and is divided into two segments which are polarized into two polarities.

As shown in FIG. 4, a secondary magnetic driving unit 60 is provided at a position on the line CY, on the Y1-direction side of the shaft 49 and adjacent to the bearing 48. As can be seen in the figure, the secondary magnetic driving unit 60 is provided within a region of the hub part 47a. Also, "on the Y1-direction side of the shaft 49" means "on the opposite side of the spindle 46 of the magnetic disk 45 with respect to the axis CX". The secondary magnetic driving unit 60 corresponds to a second driving means.

The secondary magnetic driving unit 60 is actuated during a track-following operation. Therefore, a driving force required for the secondary magnetic driving unit 60 may be smaller compared to that required for the seek operation. Thus, the secondary magnetic driving unit 60 has a relatively small size compared to the main magnetic driving unit 51 and is assembled in a region within the hub 47a when viewed in the plan view.

Figure 5B:
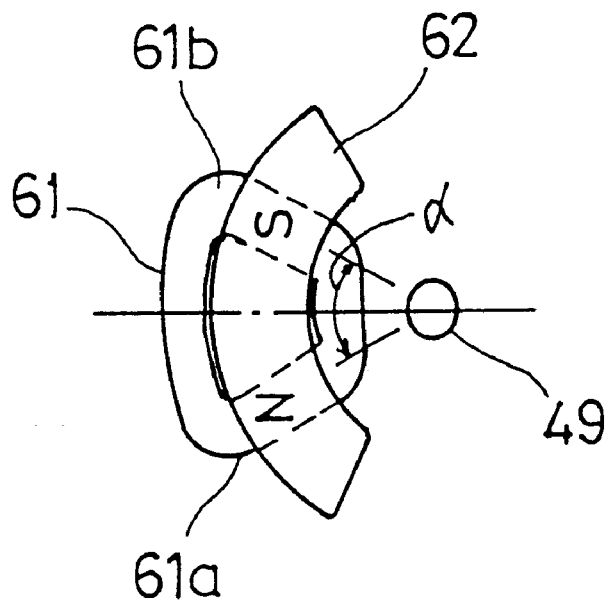

Referring now to FIGS. 5A and 5B, The secondary magnetic driving unit 60 includes a flat quadrilateral driving coil 61 and a permanent magnet 62, which are placed in a mutually opposing manner. The secondary magnetic driving unit 60 further includes yokes 63, 64. The driving coil 61 is secured on the top surface of the yoke 63 and is secured on the chassis base 44. Of course, the chassis base 44 may be constructed as a magnetic body so as to serve as the yoke 63.

The permanent magnet 62 is secured at the lower surface of the yoke 64 and is secured in a recessed part 47a1 at the lower surface of the hub 47a. The permanent magnet 62 has a flat arcuate shape, and is divided into two segments which are polarized into two polarities. The size of the driving coil 61 is provided such that an angle α between two sides 61a, 61b extending in radial directions passing through the shaft 49 is the same as an angle α between the corresponding sides of the driving coil 53. This is to ensure that the secondary magnetic driving unit 60 can be operated in a normal manner irrespective of the pivotal position of the head carriage 47.

In the magnetic head carriage assembly 41 of the above-described structure, as shown in FIGS. 3A and 3B, the secondary magnetic driving unit 60 is provided at a position substantially opposite to the magnetic disk 45 with respect to the shaft 49. Therefore, the magnetic disk 45 and the magnetic head carriage assembly 41 are positioned in a similar manner to the positioning of the normal magnetic head carriage assembly (i.e., a structure having the main magnetic driving unit 51 but not the secondary magnetic driving unit 60). Thus, the magnetic disk device 30 can be assembled efficiently. Also, since the magnetic disk 45, is at a certain distance from the permanent magnet 62 of the secondary magnetic driving unit 60, the recorded information on the magnetic disk 45 will not be affected by a magnetic force of the permanent magnet 62.

In the following, the magnetic disk device 40 will be described with regards to its operation.

During operation of the magnetic disk device 40, the magnetic head carriage assembly 41 operates under control of a micro-controller unit (MCU) 70 shown in FIG. 6. In a reading operation, information picked up from the rotating magnetic disk 45 by the magnetic head slider 42 is read by a read/write circuit 72. In a writing operation, the information output from the read/write circuit 72 is written into the magnetic disk 45 by the magnetic head slider 42. Also, using the information picked up from the rotating magnetic disk 45 by the magnetic head slider 42, a position detecting circuit 73 detects a track 45a of the magnetic disk 45 which is being traced by the magnetic head slider 42.

The MCU 70 generates a command for causing a seek operation and a switching-over from the seek operation to the track-following operation. This command is referred to as a seek command.

Figure 7A:
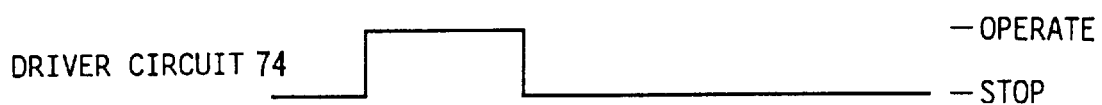
FIGS. 7A and 7B are timing charts showing operations of the driving circuit.

When a seek command is submitted from the MCU 70, a main magnetic-driving-unit driver circuit 74 is operated, so that a driving current is supplied to the driving coil 53 (see FIG. 4). Then, the main magnetic driving unit 51 is actuated as shown in FIG. 7A, causing the head carriage 47 to pivot such that the magnetic head slider 42 is moved to a predetermined track. The main magnetic driving unit 51 generates a comparatively great force F10, so that the head carriage 47 is pivoted rapidly and the seek operation is completed within a short period of time.

Figure 7B:
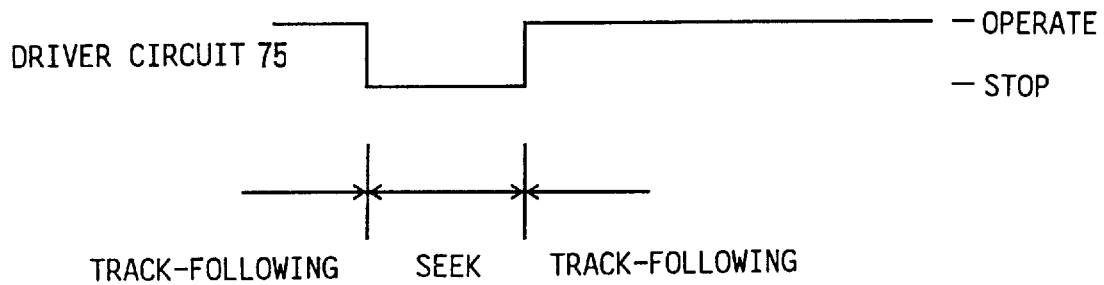
Figure 8A:
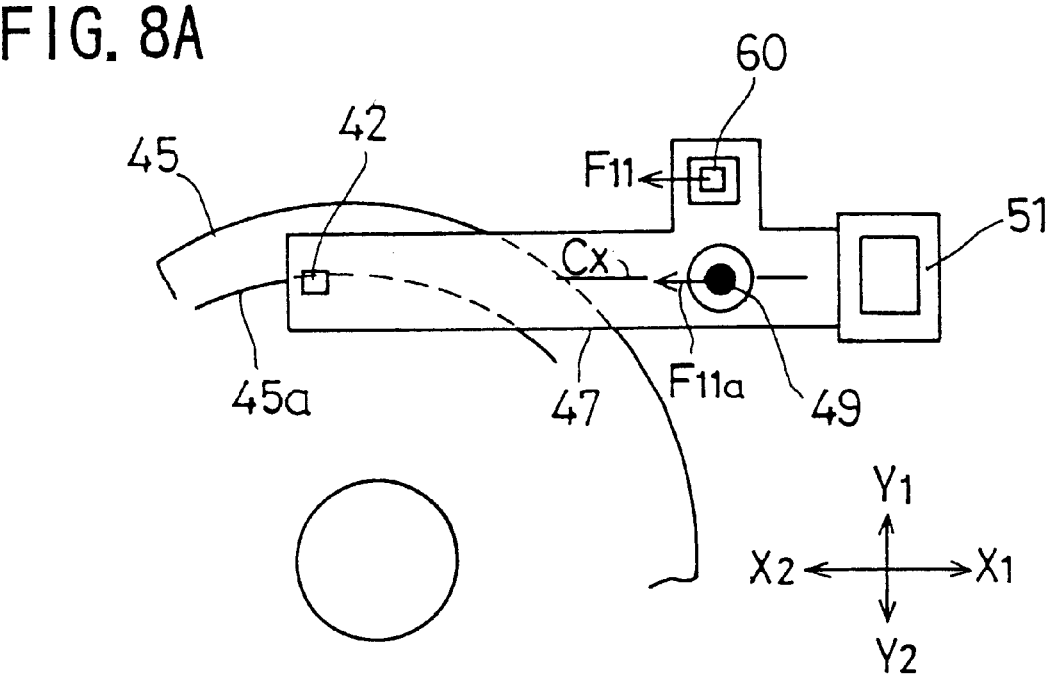
FIGS. 8A and 8B are plan views illustrating effects on the magnetic head carriage assembly during a track-following operation.
Figure 8B:
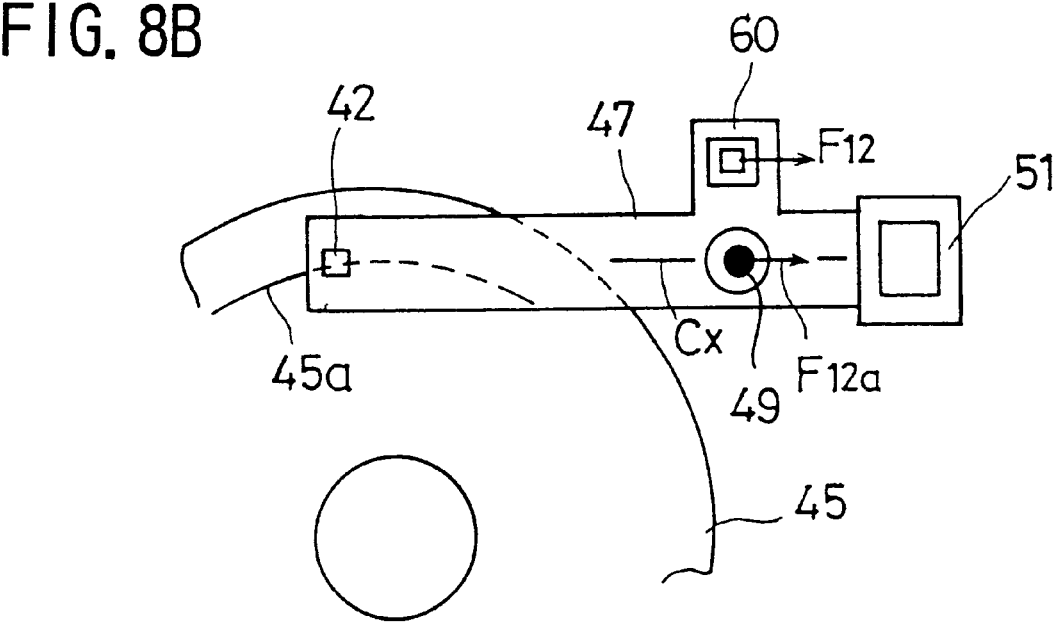

Once the magnetic head slider 42 is moved to the predetermined track, a track-following command is submitted from the MCU 70. Then, the main magnetic driving unit 51 stops its operation and the secondary magnetic-driving-unit driver circuit 75 starts operating as shown in FIG. 7B. The secondary magnetic-driving-unit driver circuit 75 supplies a driving current to the driving coil 61 based on the information obtained from the position detecting circuit 73. For this purpose, the secondary magnetic driving unit 60 is actuated as shown in FIGS. 8A and 8B, so that the head carriage 47 is pivoted,through a very small angle and the magnetic head slider 42 follows the track 45a of the rotating magnetic disk 45. Of course, the secondary magnetic driving unit 60 can also be actuated during the seek operation (not shown).

During the track-following operation, the secondary magnetic driving unit 60 generates forces F11 and F12, as shown in FIGS. 8A and 8B. The force F11 generated by the secondary magnetic driving unit 60 has an effect equivalent to a translational force F11a being produced at the shaft 49. The force F12 generated by the secondary magnetic driving unit 60 has an effect equivalent to a translational force F12a being produced at the shaft 49. The translational forces F11a, F12a act in the direction of the axis CX, i.e., in the longitudinal direction of the head carriage 47. This implies that at the magnetic head slider 42, the translational forces F11a, F12a are acting in a longitudinal direction of the track 45a of, the magnetic disk 45 and not in the direction of the width of the track 45a.

Therefore, the translational forces F11a, F12a act in a direction which does not affect a positioning of the magnetic head slider 42 against the track 45a. In other words, the translational forces F11a, F12a act in a direction which does not affect the track-following operation in which the magnetic head slider 42 follows the track 45a of the rotating magnetic disk 45. Accordingly, the positioning accuracy of the magnetic head slider 42 against the track 45a is improved, and thus an accuracy of the track-following operation is also improved.

The MCU 70, the bus 71, the position detecting circuit 73, the main magnetic-driving-unit driver circuit 74 and the secondary magnetic-driving-unit driver circuit 75 corresponds to control means.

Figure 9A:
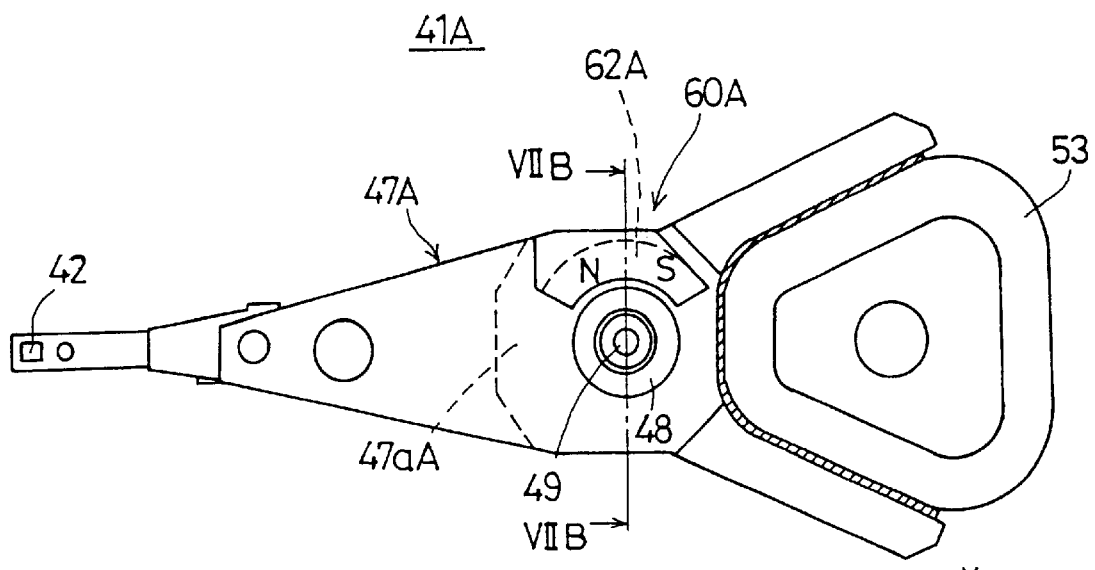
FIGS. 9A and 9B are a plan view and a cross-sectional view, respectively, showing a magnetic head carriage assembly provided on a magnetic disk device of a first variant of the first embodiment of the present invention.
Figure 9B:
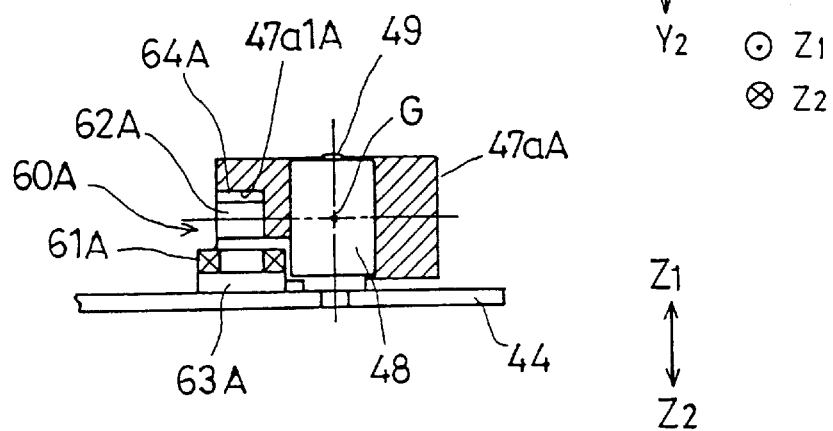

FIGS. 9A and 9B are a plan view and a cross-sectional view, respectively, showing a magnetic head carriage assembly 41A provided on magnetic disk device of a first variant of the first embodiment of the present invention. The magnetic head carriage assembly 41A is identical to the above-described magnetic head carriage assembly 41 except for a secondary magnetic driving unit 60A. As shown in FIG. 9B, the secondary magnetic driving unit 60A includes a permanent magnet 62A provided at the same level as the center of gravity G of the head carriage 47A in the Z1-Z2 direction. A recessed part 47a1A at the lower surface of a hub 47aA has a larger size compared to the above-described recessed part 47a1.

With this magnetic head carriage assembly 41A, there will be no tipping mode produced which causes the head carriage assembly 41A to tip during the track-following operation. Accordingly, the positioning accuracy of the magnetic head slider 42 against the track 45a is improved, and thus an accuracy of the track-following operation is also improved.

Figure 10A:
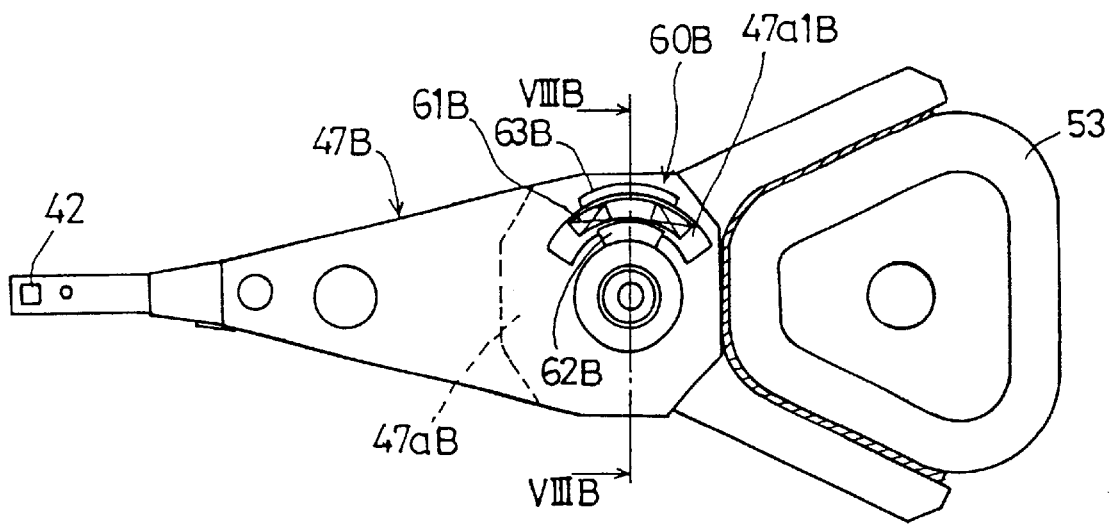
FIGS. 10A and 10B are a plan view and a cross-sectional view, respectively, showing a magnetic head carriage assembly provided on a magnetic disk device of a second variant of the first embodiment of the present invention.
Figure 10B:
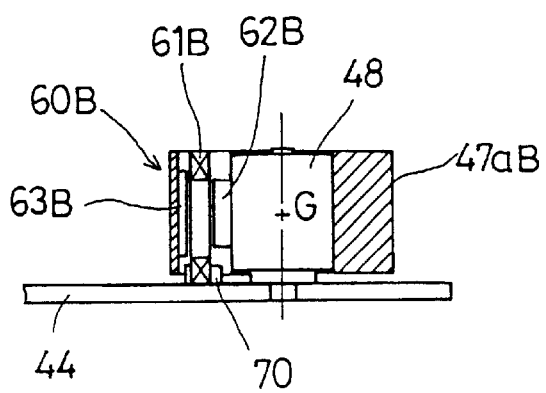

FIGS. 10A and 10B are a plan view and a cross-sectional view, respectively, showing a magnetic head carriage assembly 41B provided on a magnetic disk device of a second variant of the first embodiment of the present invention. The magnetic head carriage assembly 41B is identical to the above-described magnetic head carriage assembly 41 except for a secondary magnetic driving unit 60B.

As shown in FIG. 10B, the secondary magnetic driving unit 60B includes a flat quadrilateral driving coil 61B, a permanent magnet 62B and a yoke 63B. The driving coil 61B is vertically fixed on the chassis base 44 by means of a coil support 70 and is placed within an arcuate slit 47a1B formed in a hub part 47aB. The permanent magnet 62B is secured at the peripheral part of the bearing 48 and the yoke 63B is secured on a wall surface of the arcuate slit 47a1B. The permanent magnet 62B is provided at the same level as the center of gravity G of the head carriage 47B in the Z1-Z2 direction.

With this magnetic head carriage assembly 41B, there will be no tipping mode produced which causes the head carriage assembly 41B to tip during the track-following operation. Accordingly, the positioning accuracy of the magnetic head slider 42 against the track 45a is improved, and thus an accuracy of the track-following operation is also improved.

FIGS. 11A and 11B are a plan view and a cross-sectional view, respectively, showing a magnetic head carriage assembly 41C provided a on magnetic disk device of a second embodiment of the present invention. The magnetic head carriage assembly 41C is identical to the above-described magnetic head carriage assembly 41 except for a secondary magnetic driving unit 60C.

The secondary magnetic driving unit 60C is provided at a position on the line CX, on the X2-direction side of the shaft 49 (on the magnetic head slider 42 side) and adjacent to the bearing 48. As can be seen in the figure, the secondary magnetic driving unit 60C is provided within a region of a hub part 47aC.

As shown in FIG. 11B, the secondary magnetic driving unit 60C includes a flat quadrilateral driving coil 61C, a permanent magnet 62C and a yoke 63C. The driving coil 61C is vertically fixed on the chassis base 44 by means of the coil support 70 and is placed within an arcuate slit 47a1C formed in a hub part 47aC. The permanent magnet 62C is secured at the peripheral part of the bearing 48 and the yoke 63C is secured on a wall surface of the arcuate slit 47a1C.

As shown in FIG. 11A, the magnetic head carriage assembly 41C is provided with the secondary magnetic driving unit 60C having a reduced size. This secondary magnetic driving unit 60C is provided adjacent to the bearing 48 and within a region of the hub part 47aC. Therefore, the magnetic disk 45 and the magnetic head carriage assembly 41C are positioned in a similar manner as in a disk device where a normal magnetic head carriage device is used. Therefore, the magnetic disk device can be assembled efficiently.

Figure 12:
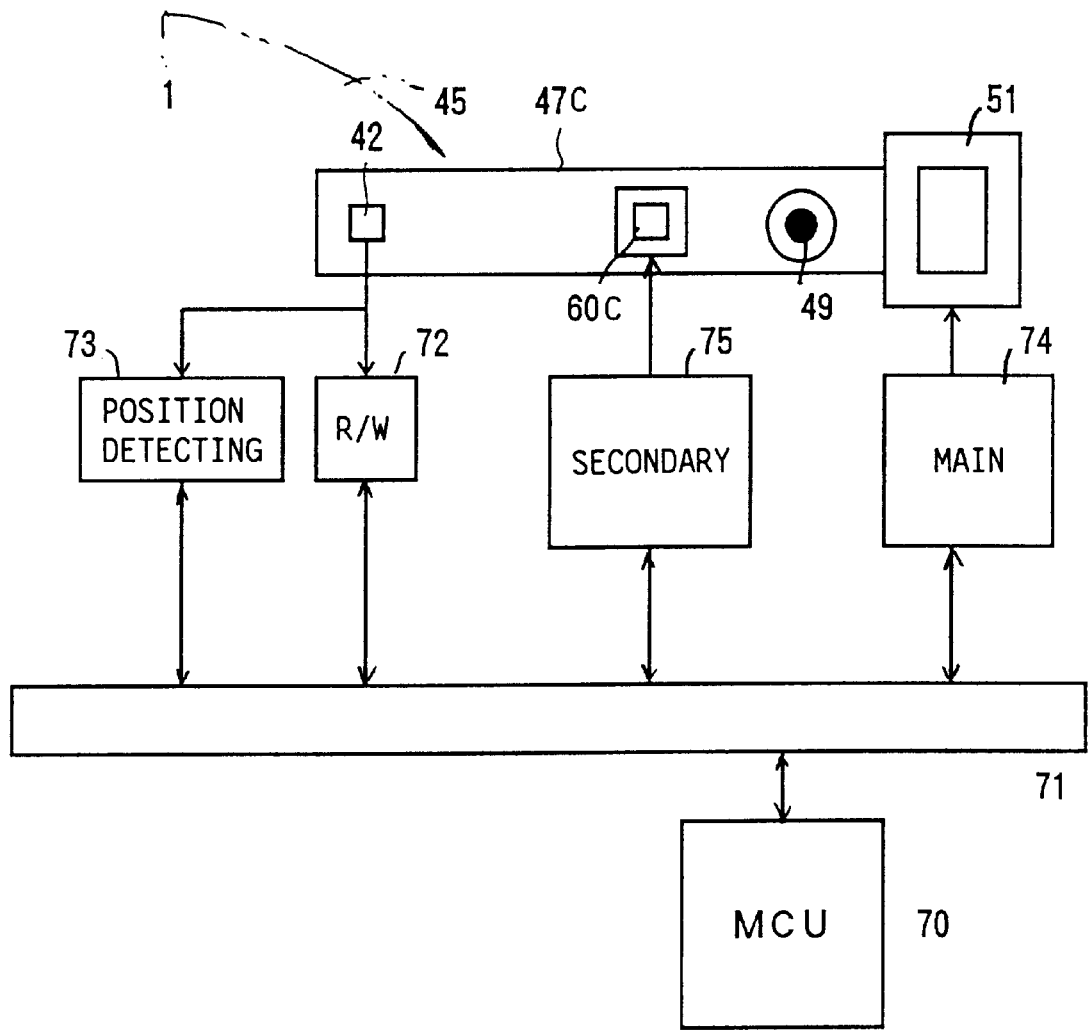
FIG. 12 is a block diagram showing a circuit associated with the magnetic head carriage assembly.

FIG. 12 is a block diagram showing a circuit associated with the magnetic head carriage assembly 41C. The magnetic head carriage assembly 41C is operated under control of the micro-controller unit (MCU) 70.

In order to achieve a required object, the magnetic head carriage assembly 41C operates either in a first mode of operation or in a second mode operation described below.

Figure 13A:
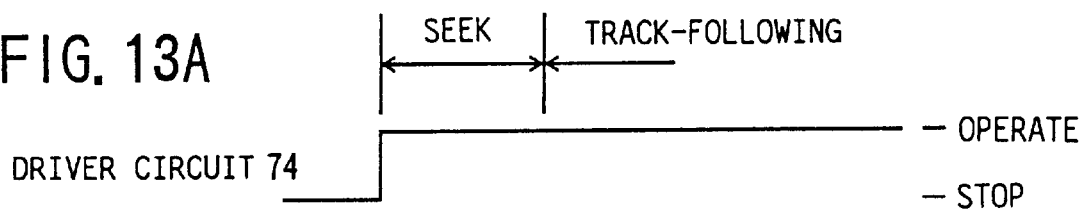
FIGS. 13A and 13B are timing charts showing operations of the driving circuit in a first mode of operation.
Figure 13B:

FIGS. 13A and 13B are timing charts showing operations of the driving circuit in a first mode of operation. When a seek command is submitted from the MCU 70, the main magnetic-driving-unit driver circuit 74 is operated, so that a driving current is supplied to the driving coil 53. Then, the main magnetic driving unit 51 is actuated as shown in FIG. 13A, which causes the head carriage 47C to pivot such that the magnetic head slider 42 is moved to a predetermined track. During the seek operation, the secondary magnetic driving unit 60C is not actuated.

Once the magnetic head slider 42 has been moved to the predetermined track, a track-following command is submitted from the MCU 70. Then, the secondary magnetic-driving-unit driver circuit 75 starts operating as well as the main magnetic-driving-unit driver circuit 74, as shown in FIG. 13B.

Figure 14A:
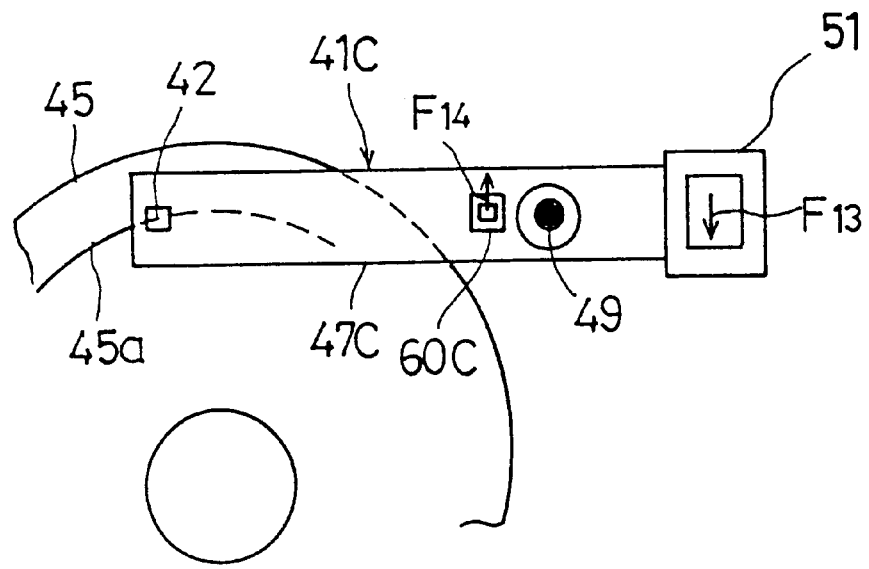
FIGS. 14A and 14B are plan views illustrating effects on the magnetic head carriage assembly during a track-following operation in the first mode of operation.
Figure 14B:
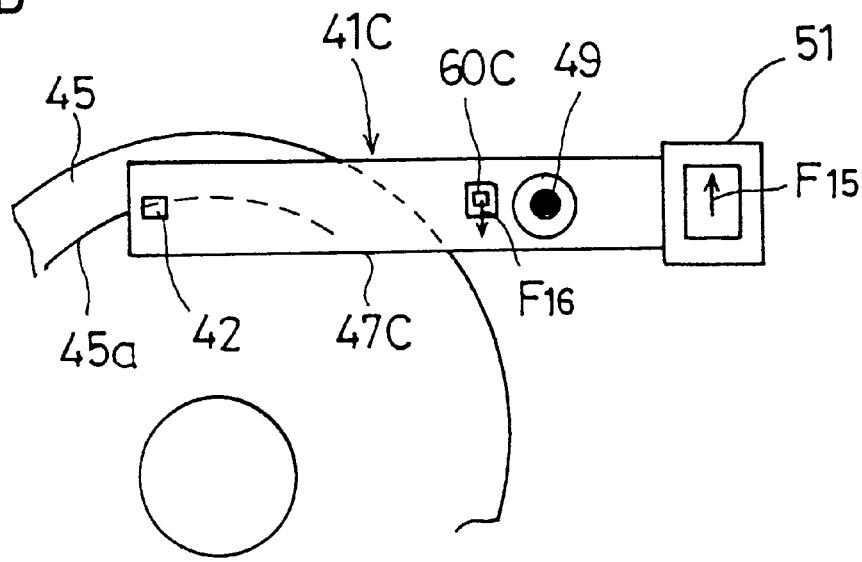

FIGS. 14A and 14B are plan views illustrating effects on the magnetic head carriage assembly 41C during a track-following operation in the first mode of operation.

FIG. 14A shows a case where the magnetic head slider 42 is offset from the center of the track 45a of the rotating magnetic disk 45 in the direction towards the center of the magnetic disk 45. As shown in the figure, the main magnetic driving unit 51 produces a force F13 and the secondary magnetic driving unit 60C produces a force F14, so that the head carriage 47C is slightly pivoted in a clockwise direction so as to follow the track 45a.

FIG. 14B shows the other case where the magnetic head slider 42 is offset from the center of the track 45a of the rotating magnetic disk 45 in the direction towards the periphery of the magnetic disk 45. As shown in the figure, the main magnetic driving unit 51 produces a force F15 and the secondary magnetic driving unit 60C produces a force F16, so that the head carriage 47C is slightly pivoted in a counter-clockwise direction so as to follow the track 45a.

Here, the gains of the amplifiers (not shown) on the output side of the respective driver circuits 74, 75 are adjusted such that the forces F13 and F14 are of equal magnitude and forces F15 and F16 are also of equal magnitude.

Thus, in both cases shown in FIGS. 14A and 14B, any translational force acting on the shaft 49 is cancelled so that the head carriage 47C is only subjected to a torque about the shaft 49. That is to say, there will be no translational force acting on the shaft 49.

Figure 15A:
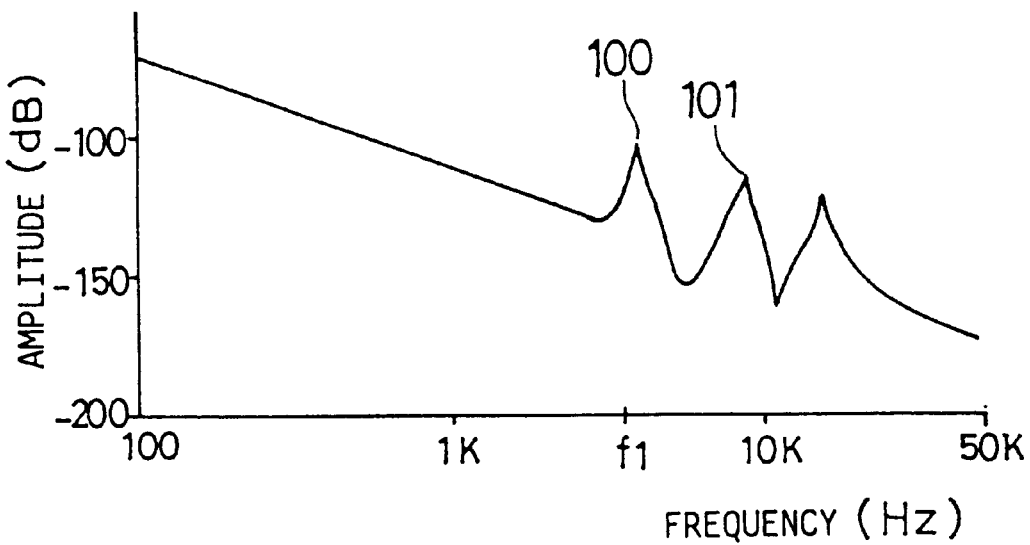
FIG. 15A is a graph showing a frequency response of the magnetic head carriage assembly of the related art and FIG. 15B is a graph showing a frequency response of the magnetic head carriage assembly shown in FIGS. 11A and 11B in the first mode of operation, both of which graphs being graphs of amplitude versus frequency.
Figure 15B:
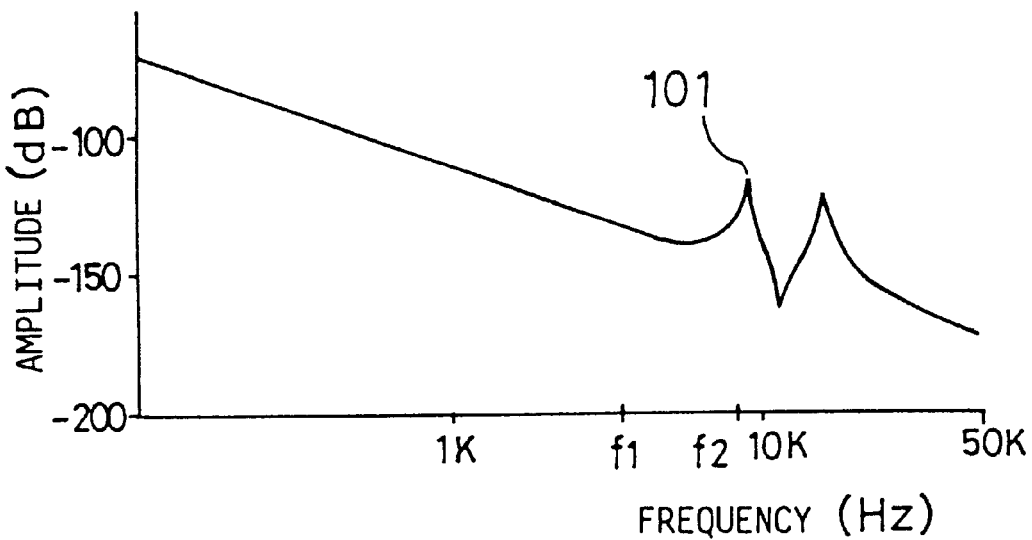

FIG. 15A is a graph showing a frequency response of the magnetic head carriage assembly of the related art (a structure similar to that of the magnetic head carriage assembly 41 shown in FIG. 11A but without the secondary magnetic driving unit 60C). FIG. 15B is a graph showing a frequency response of the magnetic head carriage assembly shown in FIGS. 11A and 11B.

With the magnetic head carriage assembly of the prior art, a translational force acts on the bearing which is an axis of pivotal movement of the magnetic head carriage assembly. Therefore, as shown in FIG. 15A, a resonance peak 100 occurs at a frequency f1 (approximately 4 kHz), which peak is mainly caused by a translational rigidity of the bearing. A resonance peak 101 occurs at a frequency f2 (approximately 8 kHz) which is higher that the frequency f1, which peak is mainly caused by an in-plane mode of the arm part 47b.

With the magnetic head carriage assembly 41C, since no translational force acts on the shaft 49, hardly any translational mode of the shaft 49 is excited. Therefore, as shown in FIG. 15B, the above-described resonance peak 100 is not observed. Thus, a primary resonant frequency limiting the servo bandwidth is increased, and the crossover frequency of the open loop is increased. Therefore, an accuracy of the track-following operation is improved.

Also, the permanent magnet 62C is provided at the same level as the center of gravity G of the head carriage 47C in the Z1-Z2 direction. Therefore, there will be no tipping mode produced which causes the head carriage assembly 41C to tip during the track-following operation. Thus, the track-following operation is achieved with a higher accuracy.

Figure 16A:
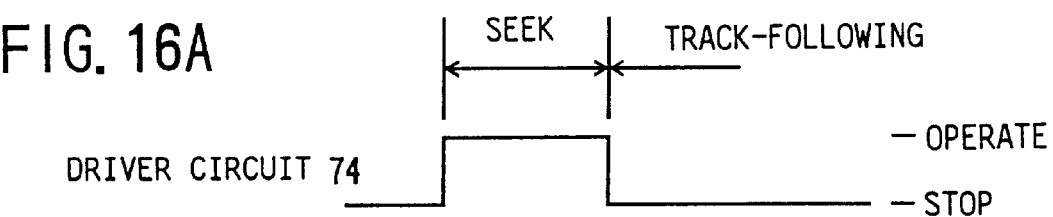
FIGS. 16A and 16B are timing charts showing operations of the driving circuit in a second mode of operation.
Figure 16B:

FIGS. 16A and 16B are timing charts showing operations of the driving circuit in a second mode of operation. Once the magnetic head slider 42 is moved to the predetermined track in the same manner as in the first mode, a track-following command is submitted from the MCU 70. Then, the main magnetic driving unit 51 stops its operation and the secondary magnetic-driving-unit driver circuit 75 starts operating as shown in FIG. 16B.

Figure 17A:
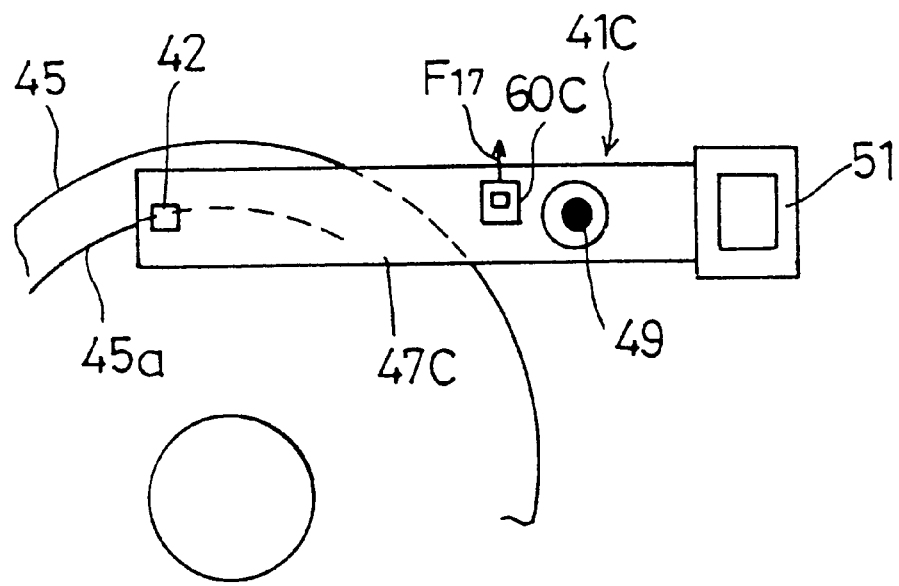
FIGS. 17A and 17B are plan views illustrating effects on the magnetic head carriage assembly during a track-following operation in the second mode of operation.
Figure 17B:
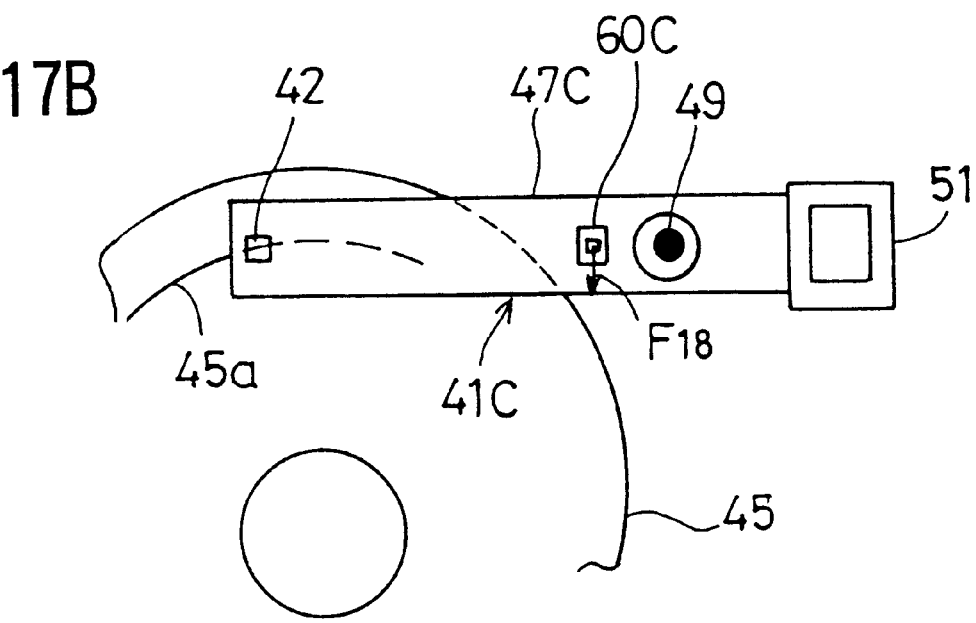

FIGS. 17A and 17B are plan views illustrating effects on the magnetic head carriage assembly during a track-following operation in the second mode of operation.

FIG. 17A shows a case where the magnetic head slider 42 is offset from the center of the track 45a of the rotating magnetic disk 45 in the direction towards the center of the magnetic disk 45. As shown in the figure, the secondary magnetic driving unit 60C produces a force F17, so that the head carriage 47C is slightly pivoted in a clockwise direction so as to follow the track 45a.

FIG. 17B shows the other case where the magnetic head slider 42 is offset from the center of the track 45a of the rotating magnetic disk 45 in the direction towards the periphery of the magnetic disk 45. As shown in the figure, the secondary magnetic driving unit 60C produces a force F18, so that the head carriage 47C is slightly pivoted in a counter-clockwise direction so as to follow the track 45a.

Figure 18A:
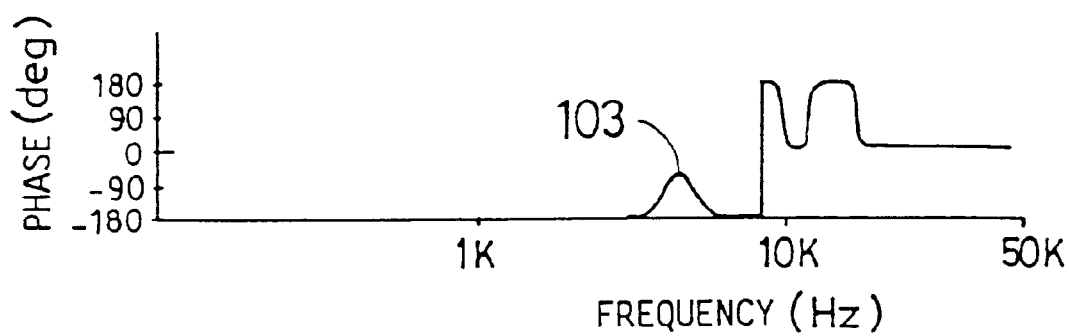
FIG. 18A is a graph of phase versus frequency and FIG. 18B is a graph of amplitude versus frequency, both of which graphs showing frequency response of the magnetic head carriage assembly in FIGS. 11A and 11B in the second mode of operation.
Figure 18B:
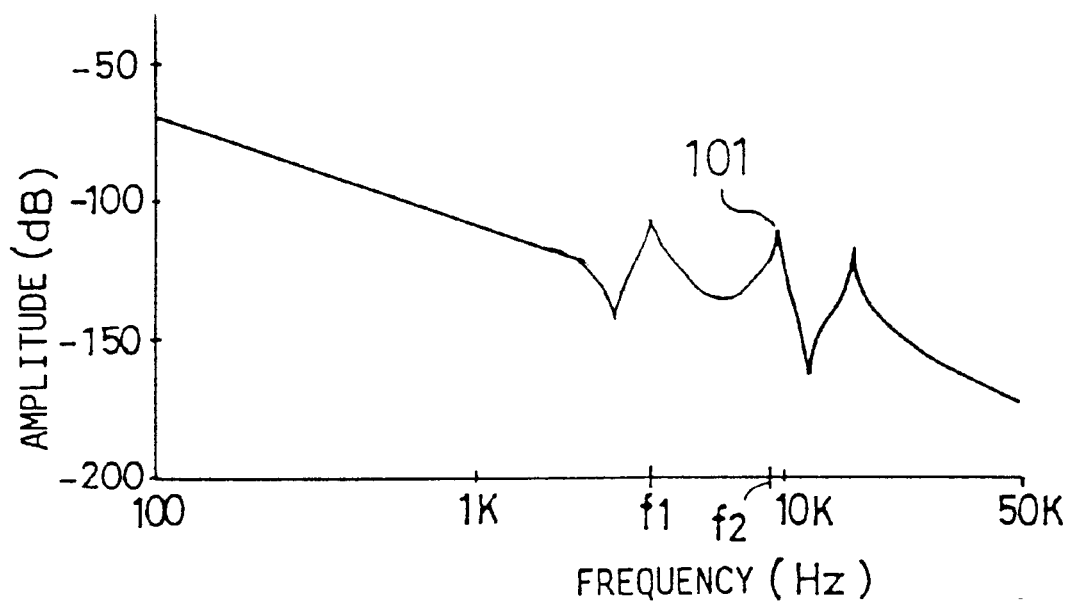

In both cases shown in FIGS. 17A and 17B, the forces F17 and F18 act at a position inward of the shaft 49. toward the magnetic head slider 42. Therefore, frequency response of the magnetic head carriage assembly 41C may be plotted as shown in FIGS. 18A and 18B. As shown by a reference numeral 103 in FIG. 18A, a mode mainly caused by the rigidity of the bearing occurs at the same phase as the phase of the rigid body mode. Therefore, the stability of the track-following operation is maintained.

Also, the permanent magnet 62C is provided at the same level as the center of gravity G of the head carriage 47C in the Z1-Z2 direction. Therefore, there will be no tipping mode produced which causes the head carriage assembly 41C to tip during the track-following operation. Thus the track-following operation is achieved at a higher accuracy. A primary resonant frequency limiting the servo bandwidth occurs at a resonance peak 101, so that the crossover frequency of the open loop is increased. Therefore, the track-following operation is achieved with a higher accuracy.

In the above-described first and second modes of operation, the secondary magnetic driving unit 60C may or may not be used for seek operations.

Now, first to fifth variants of the second embodiment of the present invention will be described. Each of the variants involves a variant of the secondary magnetic driving unit 60C.

Figure 19:
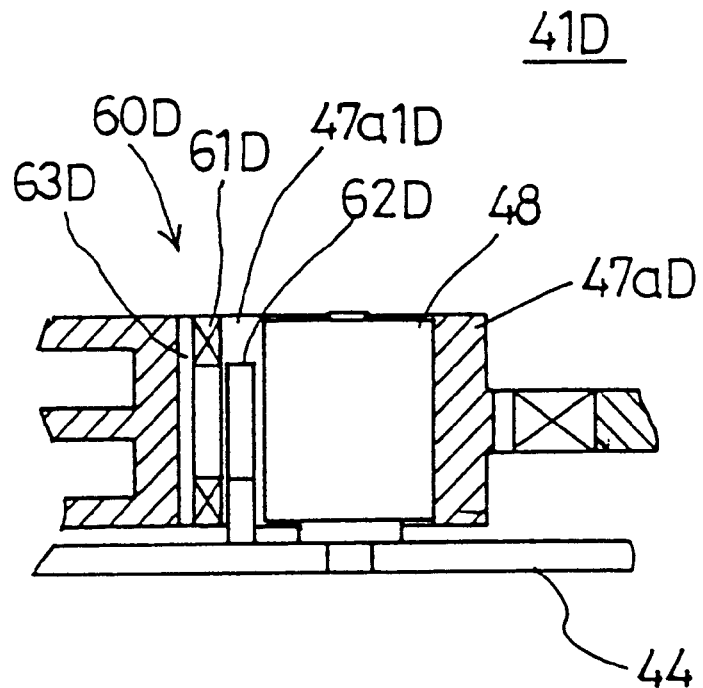
FIG. 19 is a cross-sectional view showing a magnetic head carriage assembly provided on a magnetic disk device of a first variant of the second embodiment of the present invention.

FIG. 19 is a cross-sectional view showing a magnetic head carriage assembly 41D provided on a magnetic disk device of a first variant of the second embodiment of the present invention. The magnetic head carriage assembly 41D includes a secondary magnetic driving unit 60D. The secondary magnetic driving unit 60D has a permanent magnet 62D on which is fixed and a flat driving coil 61D which moves with the head carriage 47D. The permanent magnet 62D is fixed vertically on the chassis base 44. The driving coil 61D is fixed on a yoke 63D and is fixed on the wall surface of a slit 47a1D.

Figure 20:
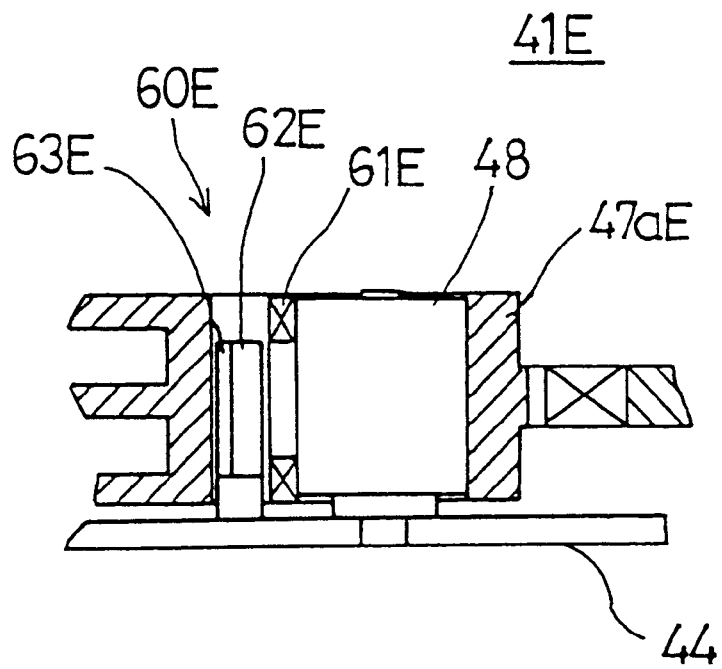
FIG. 20 is a cross-sectional view showing a magnetic head carriage assembly provided on a magnetic disk device of a second variant of the second embodiment of the present invention.

FIG. 20 is a cross-sectional view showing a magnetic head carriage assembly 41E provided on a magnetic disk device of a second variant of the second embodiment of the present invention. The magnetic head carriage assembly 41E includes a secondary magnetic driving unit 60E. The secondary magnetic driving unit 60E has a permanent magnet 62E which is fixed and a flat driving coil 61E which moves with the head carriage 47E. The permanent magnet 62E is fixed on a yoke 63E and is vertically fixed on the chassis base 44. The driving coil 61E is fixed on peripheral surface of the bearing 48.

Figure 21:
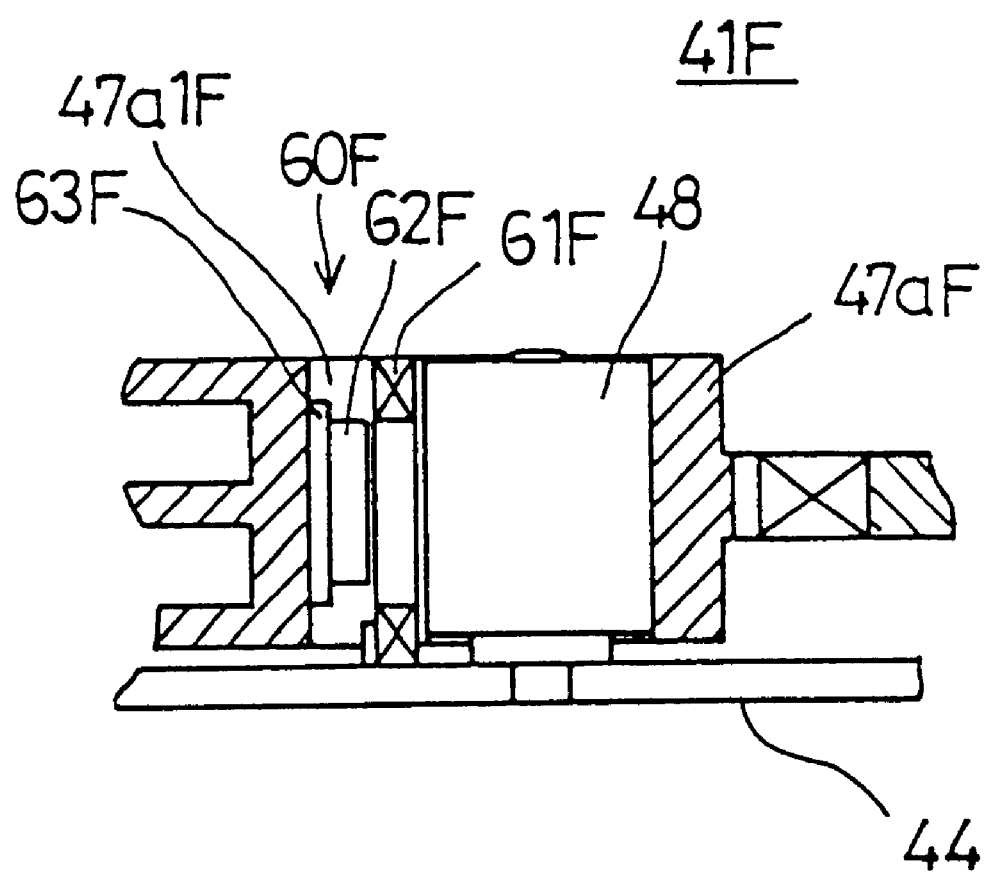
FIG. 21 is a cross-sectional view showing a magnetic head carriage assembly provided on a magnetic disk device of a third variant of the second embodiment of the present invention.

FIG. 21 is a cross-sectional view showing a magnetic head carriage assembly 41F provided on a magnetic disk device of a third variant of the second embodiment of the present invention. The magnetic head carriage assembly 41F includes a secondary magnetic driving unit 60F. The secondary magnetic driving unit 60F has a flat driving coil 61F which is fixed and a permanent magnet 62F which moves with the head carriage 47F. The driving coil 61F is vertically fixed on the chassis base 44. The permanent magnet 62F is fixed on a yoke 63F and is fixed on the wall surface of the slit 47a1F.

Figure 22A:
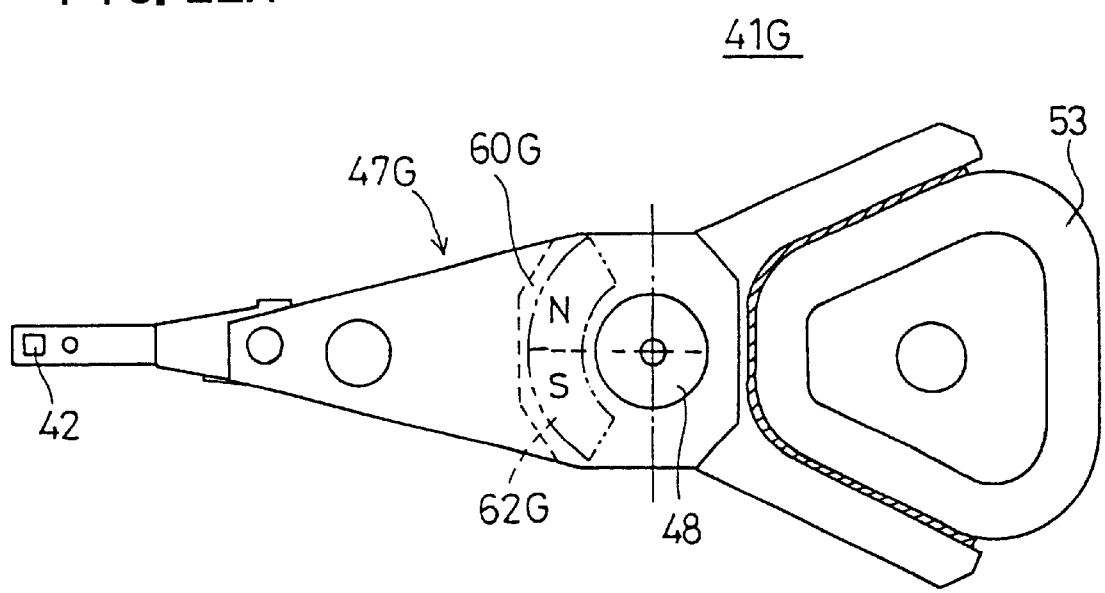
FIGS. 22A and 22B are a plan view and a cross-sectional view, respectively, showing a magnetic head carriage assembly provided on a magnetic disk device of a fourth variant of the second embodiment of the present invention.
Figure 22B:
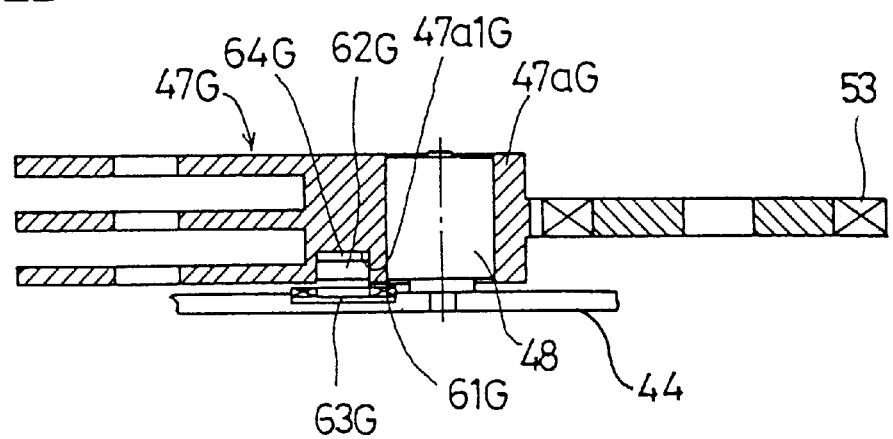

FIGS. 22A and 22B are a plan view and a cross-sectional view, respectively, showing a magnetic head carriage assembly 41G provided on a magnetic disk device of a fourth variant of the second embodiment of the present invention. The magnetic head carriage assembly 41G includes a secondary magnetic driving unit 60G. The secondary magnetic driving unit 60G has a flat driving coil 61G which is fixed and a permanent magnet 62G which moves with the head carriage 47G. The driving coil 61G is fixed on the upper surface of a yoke 63G and is fixed on the chassis base 44. The permanent magnet 62G is fixed on a yoke 64G and is fixed in a recessed part 47a1G at the bottom surface of the hub part 47aG.

Figure 23A:
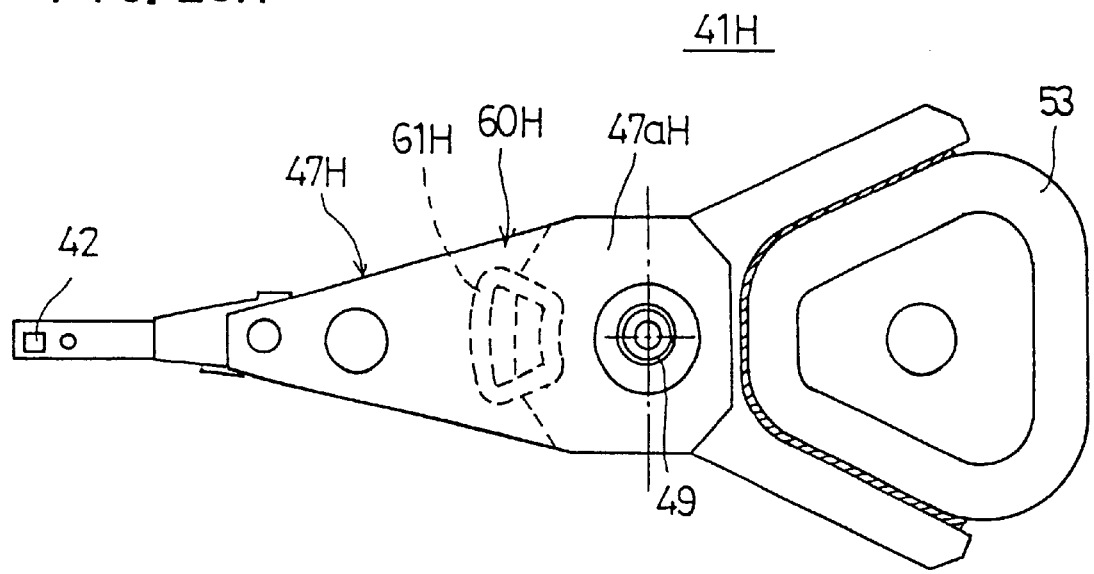
FIGS. 23A and 23B are a plan view and a cross-sectional view, respectively, showing a magnetic head carriage assembly provided on a magnetic disk device of a fifth variant of the second embodiment of the present invention.
Figure 23B:
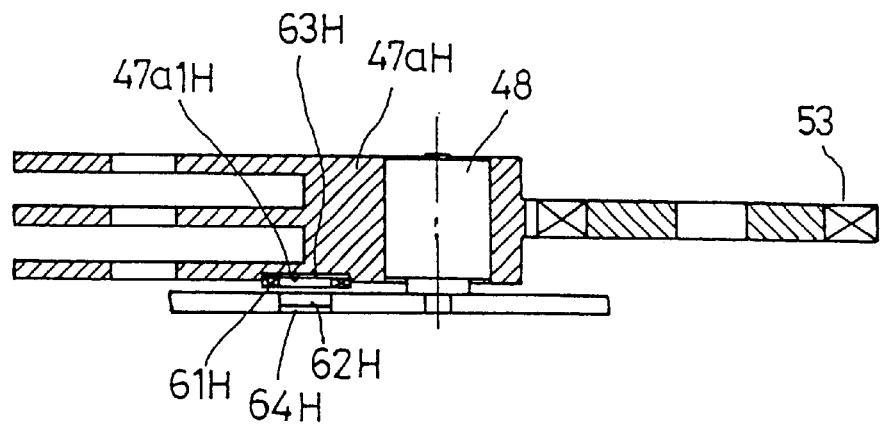

FIGS. 23A and 23B are a plan view and a cross-sectional view, respectively, showing a magnetic head carriage assembly 41H provided on a magnetic disk device of a fifth variant of the second embodiment of the present invention. The magnetic head carriage assembly 41H includes a secondary magnetic driving unit 60H. The secondary magnetic driving unit 60H has a structure similar to that of the above-described secondary magnetic driving unit 60G. The secondary magnetic driving unit 60H has a permanent magnet 62H which is fixed and a flat driving coil 61H which moves with the head carriage 47H. The permanent magnet 62H is fixed on the upper surface of a yoke 63H and is fixed on the chassis base 44. The driving coil 61H is fixed on a yoke 63H and is fixed in a recessed part 47a1H at the bottom surface of the hub part 47aH.

Also, in each of the embodiments, instead of the magnetic head slider, it is possible to mount an optical head slider having an optical head integrated into a slider. Therefore, the present invention can be implemented in devices such as a suspension for an optical head slider, an optical head slider supporting device and an optical disk device.

Further, the present invention is not limited to these embodiments, but variations and modifications may be made without departing from the scope of the present invention.

The present application is based on Japanese priority application No. 10-72882 filed on Mar. 20, 1998, the entire contents of which are hereby incorporated by reference.

What is claimed is:

1. A head carriage assembly comprising:
   a head carriage having a magnetic head at a first end part and a bearing between said first end part and a second end part, said head carriage being pivotable about a shaft cooperating with said bearing in such a manner that said magnetic head moves in a radial direction of a rotating disk to be read;
   first driving means provided at said second end of said head carriage and generating a force for pivoting said head carriage; and
   second driving means generating a further force for pivoting said head carriage, said second driving means being provided at a location on only one side of said carriage on a line passing through said shaft and perpendicular to a longitudinal axis of said head carriage,
   wherein said location of said second driving means is on an opposite side of a center of rotation of the disk with respect to said longitudinal axis.

2. The head carriage assembly as claimed in claim 1, wherein said head carriage includes a hub part fitting to said shaft, and said second driving means is provided at said hub part of said head carriage.

3. The head carriage assembly as claimed in claim 2, wherein said second driving means comprises a coil and a permanent magnet opposing said coil.

4. The head carriage assembly as claimed in claim 3, wherein said coil is provided on a chassis base in a horizontal manner and said permanent magnet is provided at a lower surface of said hub part.

5. The head carriage assembly as claimed in claim 3, wherein said coil is vertically fixed on a chassis base and within an arcuate slit formed in said hub part and said permanent magnet is secured at the peripheral part of said bearing at the same level as the center of gravity of the head carriage.

6. A head carriage assembly comprising:
   a head carriage having a magnetic head at a first end part and a bearing between said first end part and a second end part, said head carriage being pivotable about a shaft cooperating with said bearing in such a manner that said magnetic head moves in a radial direction of a rotating disk to be read;
   first driving means provided at said second end of said head carriage and generating a force for pivoting said head carriage; and second driving means generating a further force for pivoting said head carriage, wherein said second driving means comprises a coil and a permanent magnet opposing said coil, and wherein said coil is provided on a chassis base in a horizontal manner and said permanent magnet is provided at the same level as the center of gravity of the head carriage.

7. A head carriage assembly comprising:

a head carriage having a magnetic head at a first end part and a bearing between said first end part and a second end part, said head carriage being pivotable about a shaft cooperating with said bearing in such a manner that said magnetic head moves in a radial direction of a rotating disk to be read;

first driving means provided at said second end of said head carriage and generating a force for pivoting said head carriage; and second driving means generating a further force for pivoting said head carriage, wherein said second driving means being provided at a location on a longitudinal axis of said head carriage between said first end and said bearing.

8. The head carriage assembly as claimed in claim 7, further comprising:

a coil; and a permanent magnet, and wherein said head carriage includes a hub part fitting to said shaft, and said second driving means is provided at said hub part of said head carriage.

9. The head carriage assembly as claimed in claim 8, wherein said coil is provided on a chassis base in a vertical manner and within an arcuate slit formed in said hub part; and said permanent magnet is secured at the peripheral part of said bearing at the same level as the center of gravity of the head carriage.

10. The head carriage assembly as claimed in claim 8, wherein said coil is secured on a wall surface of an arcuate slit formed in said hub part in a vertical manner; and said permanent magnet is provided on a chassis base in a vertical manner and within said arcuate slit formed in said hub part.

11. The head carriage assembly as claimed in claim 8, wherein said coil is secured at the peripheral part of said bearing; and said permanent magnet is provided on a chassis base in a vertical manner and within an arcuate slit formed in said hub part.

12. The head carriage assembly as claimed in claim 8, wherein said coil is provided on a chassis base in a vertical manner and within an arcuate slit formed in said hub part; and said permanent magnet is secured on a wall surface of said arcuate slit formed in said hub part in a vertical manner.

13. The head carriage assembly as claimed in claim 8, wherein said coil is provided on a chassis base in a horizontal manner; and said permanent magnet is provided at a lower surface of said hub part.

14. The head carriage assembly as claimed in claim 8, wherein said coil is provided at a lower surface of said hub parts; and said permanent magnet is provided on a chassis base in a horizontal manner.

15. A head carriage assembly comprising:

a head carriage having a magnetic head at a first end part and a bearing between said first end part and a second end part, said head carriage being pivotable about a shaft cooperating with said bearing in such a manner that said magnetic head moves in a radial direction of a rotating disk to be read;

first driving means provided at said second end of said head carriage and generating a force for pivoting said head carriage; and second driving means generating a further force for pivoting said head carriage, wherein said second driving means being provided at a location on a longitudinal axis of said head carriage between said first end and said bearing, wherein said second driving means comprises a coil and a permanent magnet opposing said coil.

16. A disk device comprising:

1) a chassis base;

2) a disk to be rotated about a spindle fixed on said chassis base;

3) a head carnage assembly comprising:

a head carriage having a magnetic head at a first end part and a bearing between said first end part and a second end part, said head carriage being pivotable about a shaft cooperating with said bearing in such a manner that said magnetic head moves in a radial direction of said rotating disk to be read;

fit driving means provided at said second end of said head carriage and generating a force for pivoting said head carriage; and second driving means also generating a force for pivoting said head carriage, said second driving means being provided at a location on only one side of said carriage on a line passing through said shaft and perpendicular to a longitudinal axis of said head carriage; and 4) control means so as to operate said head carriage assembly either in a seek operation in which said head is moved to another track or in a track-following operation in which said head is moved to follow a track on which said head is currently placed.

17. The disk device as claimed in claim 16, wherein, in said seek operation, said control means actuates at least said first driving means, and in said track-following operation, said control means stops said first driving means and actuates said second driving means if said second driving means has not been actuated in said seek operation.

18. A disk device comprising:

1) a chassis base;

2) a disk to be rotated about a spindle fixed on said chassis base;

3) a head carriage assembly comprising:

a head carriage having a magnetic head at a first end part and a bearing between said first end part and a second end part, said head carriage being pivotable about a shaft cooperating with said bearing in such a manner that said magnetic head moves in a radial direction of said rotating disk to be read;

first driving means provided at said second end of said head carriage and generating a force for pivoting said head carriage; and second driving means also generating a force for pivoting said head carriage, said second driving means being provided at a location on a longitudinal axis of said head carriage between said first end and said bearing; and 4) control means so as to operate said head carriage assembly either in a seek operation in which said head is moved to another track or in a track-following operation in which said head is moved to follow a track on which said head is currently placed.

19. The disk device as claimed in claim 18, wherein, in said seek operation, said control means actuates at least said first driving means, and in said track-following operation, said control means further actuates said second driving means.

20. The disk device as claimed in claim 19, wherein a magnitude of a force generated by said first driving means is equal to a magnitude of a force generated by said second driving means.

21. The disk device as claimed in claim 18, wherein, in said seek operation, said control means actuates at least said first driving means, and in said track-following operation, said control means turns off said first driving means and actuates said second driving means.

* * * * *

UNITED STATES PATENT AND TRADEMARK OFFICE
CERTIFICATE OF CORRECTION

PATENT NO. : 6,392,848 B1
DATED : May 21, 2002
INVENTOR(S) : Koganezawa

It is certified that error appears in the above-identified patent and that said Letters Patent is hereby corrected as shown below:

<u>Title page,</u>
Item [57], ABSTRACT,
Line 9, please delete ", second driving device" and insert -- second driving means --.

Signed and Sealed this

Twenty-ninth Day of April, 2003

JAMES E. ROGAN
*Director of the United States Patent and Trademark Office*